United States Patent
Tao

(10) Patent No.: US 10,936,278 B2
(45) Date of Patent: Mar. 2, 2021

(54) METHOD AND APPARATUS FOR MANAGING MEDIA FILE IN MANAGED DEVICE

(71) Applicant: Huawei Technologies Co., Ltd., Shenzhen (CN)

(72) Inventor: Zhidong Tao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/474,224

(22) PCT Filed: May 27, 2017

(86) PCT No.: PCT/CN2017/086391
§ 371 (c)(1),
(2) Date: Jun. 27, 2019

(87) PCT Pub. No.: WO2018/120632
PCT Pub. Date: Jul. 5, 2018

(65) Prior Publication Data
US 2019/0354342 A1    Nov. 21, 2019

(30) Foreign Application Priority Data
Dec. 30, 2016    (CN) .......................... 201611261547.2

(51) Int. Cl.
*G06F 15/16*    (2006.01)
*G06F 3/16*    (2006.01)
*H04L 29/08*    (2006.01)

(52) U.S. Cl.
CPC .............. *G06F 3/165* (2013.01); *H04L 67/06* (2013.01); *H04L 67/104* (2013.01); *H04L 67/32* (2013.01)

(58) Field of Classification Search
CPC ....... G06F 3/165; H04L 67/06; H04L 67/104; H04L 67/32; H04B 5/00; H04M 1/725; G06K 7/00
(Continued)

(56) References Cited

U.S. PATENT DOCUMENTS 6,850,252 B1 *    2/2005    Hoffberg ............ G06K 9/00369
348/E7.061
2003/0211830 A1    11/2003    Takimoto et al.
(Continued)

FOREIGN PATENT DOCUMENTS

| CN | 101674283 B | 8/2012 |
|---|---|---|
| CN | 103023538 A | 4/2013 |

(Continued)

OTHER PUBLICATIONS

Gemmell, D. James, Harrick M. Vin, Dilip D. Kandlur, P. Venkat Rangan, and Lawrence A. Rowe. "Multimedia storage servers: A tutorial." Computer 28, No. 5 (1995): 40-49. (Year: 1995).*
(Continued)

*Primary Examiner* — Cheikh T Ndiaye
(74) *Attorney, Agent, or Firm* — Conley Rose, P.C.

(57) ABSTRACT

A method for managing a media file includes sending, by a terminal to a managed device by using a Bluetooth path between the terminal and the managed device, a first request used to obtain at least one piece of media file information stored in the managed device. The method further includes receiving, by the terminal, a first response that is sent by the managed device and that includes the at least one piece of media file information. The method further includes displaying the at least one piece of media file information on the terminal based on the first response. The method further includes after obtaining a first operation request for a target media file, sending, by the terminal to the managed device,
(Continued)

a first operation instruction used to instruct the managed device to process the target media file according to a preset operation type.

20 Claims, 10 Drawing Sheets

(58) Field of Classification Search
USPC .......................................................... 709/217
See application file for complete search history.

(56) References Cited

U.S. PATENT DOCUMENTS

| | | | |
|---|---|---|---|
| 2004/0244046 | A1* | 12/2004 | Champion ......... H04N 21/4143 725/112 |
| 2006/0195514 | A1* | 8/2006 | Rogers ................ H04L 63/0263 709/203 |
| 2010/0070637 | A1 | 3/2010 | Saito et al. |
| 2012/0124178 | A1* | 5/2012 | Sparks ................ H04L 67/1078 709/219 |
| 2012/0289155 | A1* | 11/2012 | Dua ........................ G06F 3/048 455/41.1 |
| 2013/0073584 | A1* | 3/2013 | Kuper ..................... G06F 16/44 707/769 |
| 2013/0211971 | A1* | 8/2013 | Lin ........................ G06Q 30/06 705/27.1 |
| 2016/0295348 | A1* | 10/2016 | Luna ..................... H04W 76/14 |

FOREIGN PATENT DOCUMENTS

| | | |
|---|---|---|
| CN | 103136042 A | 6/2013 |
| CN | 103593635 A | 2/2014 |
| CN | 103618824 A | 3/2014 |
| CN | 103701502 A | 4/2014 |
| CN | 104168545 A | 11/2014 |
| CN | 104299632 A | 1/2015 |
| CN | 104320158 A | 1/2015 |
| CN | 104779979 A | 7/2015 |
| CN | 104780480 A | 7/2015 |
| CN | 204616044 U | 9/2015 |
| CN | 204622056 U | 9/2015 |
| CN | 204993792 U | 1/2016 |

OTHER PUBLICATIONS

Machine Translation and Abstract of Chinese Publication No. CN103023538, Apr. 3, 2013, 20 pages.
Machine Translation and Abstract of Chinese Publication No. CN103136042, Jun. 5, 2013, 23 pages.
Machine Translation and Abstract of Chinese Publication No. CN103593635, Feb. 19, 2014, 6 pages.
Machine Translation and Abstract of Chinese Publication No. CN103618824, Mar. 5, 2014, 23 pages.
Machine Translation and Abstract of Chinese Publication No. CN103701502, Apr. 2, 2014, 4 pages.
Machine Translation and Abstract of Chinese Publication No. CN104168545, Nov. 26, 2014, 23 pages.
Machine Translation and Abstract of Chinese Publication No. CN104299632, Jan. 21, 2015, 27 pages.
Machine Translation and Abstract of Chinese Publication No. CN104320158, Jan. 28, 2015, 19 pages.
Machine Translation and Abstract of Chinese Publication No. CN104779979, Jul. 15, 2015, 13 pages.
Machine Translation and Abstract of Chinese Publication No. CN204616044, Sep. 2, 2015, 9 pages.
Machine Translation and Abstract of Chinese Publication No. CN104780480, Jul. 15, 2015, 13 pages.
Machine Translation and Abstract of Chinese Publication No. CN204622056, Sep. 9, 2015, 8 pages.
Machine Translation and Abstract of Chinese Publication No. CN204993792, Jan. 20, 2016, 15 pages.
Foreign Communication From a Counterpart Application, PCT Application No. PCT/CN2017/086391, English Translation of International Search Report dated Sep. 19, 2017, 2 pages.
Foreign Communication From a Counterpart Application, PCT Application No. PCT/CN2017/086391, English Translation of Written Opinion dated Sep. 19, 2017, 4 pages.

* cited by examiner

METHOD AND APPARATUS FOR MANAGING MEDIA FILE IN MANAGED DEVICE

This application is a National Stage application of International Patent Application No, PCT/CN2017/086391 filed on May 27, 2017, which claims priority to Chinese Patent Application No. 201611261547.2 filed on Dec. 30, 2016, both of which are hereby incorporated by reference in their entireties.

This application claims priority to Chinese Patent Application No. 201611261547.2, entitled "BLUETOOTH ACOUSTIC EQUIPMENT MANAGEMENT METHOD AND DEVICE", filed with the Chinese Patent Office on Dec. 30, 2016, which is incorporated by reference in its entirety.

TECHNICAL FIELD

Embodiments of this application relate to the field of terminal technologies, and in particular, to a method and an apparatus for managing a media file in a managed device.

BACKGROUND

Acoustic equipment (for example, a Bluetooth speaker) is a device supporting transmission of an audio media file to the acoustic equipment through Bluetooth and playing the audio media file.

A conventional Bluetooth speaker can only passively receive an audio stream generated after a terminal (for example, a mobile phone) connected to the Bluetooth speaker decodes an audio media file, then performs digital-to-analog conversion on the received audio stream, and plays the audio stream by using a horn of the Bluetooth speaker. The conventional Bluetooth speaker usually has no display interface. Consequently, when the Bluetooth speaker plays an audio media file stored in the Bluetooth speaker, a user cannot learn of information (for example, a playing progress and a name) about the played audio media file in real time. In addition, the conventional Bluetooth speaker does not define, in a protocol of communication with a terminal, a method for managing, by the terminal, an audio media file stored on an acoustic equipment side. Consequently, even though the terminal and the Bluetooth speaker establish a Bluetooth path, the terminal cannot effectively manage the audio media file stored in the acoustic equipment.

SUMMARY

This application provides a method and an apparatus for managing a media file in a managed device, to resolve a problem in the prior art that a terminal cannot manage a media file stored in acoustic equipment.

To resolve the foregoing technical problem, the following technical solutions are used in the embodiments of this application.

According to a first aspect, an embodiment of this application provides a method for managing a media file in a managed device, where the method is applied to a terminal. The terminal is in communication connection to a managed device. The method provided in this embodiment of this application includes: sending, by the terminal, a first request to the managed device by using a Bluetooth path between the terminal and the managed device, where the first request is used to obtain at least one piece of media file information stored in the managed device; receiving, by the terminal, a first response that is sent by the managed device and that includes the at least one piece of media file information; displaying, by the terminal, the at least one piece of media file information on the terminal based on the first response; and sending, by the terminal, a first operation instruction to the managed device after obtaining a first operation request for a target media file, where the first operation instruction is used to instruct the managed device to process the target media file according to a preset operation type, and the target media file is a media file indicated by any of the at least one piece of media file information displayed on the terminal. In the method for managing a media file in a managed device that is provided in this embodiment of this application, during actual use, the managed device (for example, acoustic equipment) usually does not have a display capability and the terminal has the display capability. Therefore, in this application, the terminal may obtain, by using the Bluetooth path established between the terminal and the managed device, the at least one piece of media file information stored in the managed device, and display, on the terminal by using the display capability of the terminal, the at least one piece of media file information stored in the managed device. In this way, information about at least one media file, for example, a name of the at least one media file, that is stored in the managed device or a sound image and a playing progress when the managed device plays a media file stored in the managed device may be displayed by using the display capability of the terminal. In addition, the terminal may further send the first operation instruction to the managed device based on the obtained first operation request, to be configured to instruct the managed device to perform the preset operation type on the target media file, to manage the at least one media file stored in the managed device.

With reference to the first aspect, in a first possible implementation of the first aspect, the first operation instruction includes a file identifier and the preset operation type, the file identifier is used to uniquely identify the target media file, and the preset operation type is used to instruct the managed device to process the target media file according to the preset operation type.

With reference to the first aspect or the first possible implementation of the first aspect, in a second possible implementation of the first aspect, the method provided in this embodiment of this application further includes: obtaining, by the terminal, a second operation request for a candidate media file, where the second operation request is used to instruct the terminal to store the candidate media file to the managed device; playing, by the terminal, the candidate media file when determining that the terminal has permission to download the candidate media file; and sending, by the terminal to the managed device, a first message used to instruct the managed device to store a media stream that is sent by the terminal and that is of the candidate media file. The first message is sent to the managed device to trigger the managed device to store the media stream that is sent by the terminal and that is of the candidate media file. In this way, the candidate media file can be stored to the managed device, and when the managed device is acoustic equipment, a better playing effect can be achieved and the candidate media file can be directly locally played in the managed device.

With reference to any one of the first aspect to the second possible implementation of the first aspect, in a third possible implementation of the first aspect, before the playing, by the terminal, the candidate media file when determining that the terminal has permission to download the candidate media file that is provided in this embodiment of this application, the method provided in this embodiment of the present invention further includes: obtaining, by the terminal, whether the terminal has the permission to download the candidate media file; and updating, by the terminal, a status of an operation item of the candidate media file to an enabled state when determining that the managed device has a storage capability and the terminal has the permission to download the candidate media file. In combination with the storage capability of the managed device and whether the terminal has permission to manage the candidate media file, a status of each candidate media file can be more accurately determined.

With reference to any one of the first aspect to the third possible implementation of the first aspect, in a fourth possible implementation of the first aspect, before the sending, by the terminal, a first message to the managed device, the method provided in this embodiment of the present invention further includes: obtaining, by the terminal, item label information of the candidate media file; and sending, by the terminal, the item label information of the candidate media file to the managed device. This helps the managed device encode the item label information of the candidate media file together with the media stream when storing the media stream of the candidate media file and store the candidate media file and the media stream in the managed device.

With reference to any one of the first aspect to the fourth possible implementation of the first aspect, in a fourth possible implementation of the fifth aspect, the first operation instruction is used to instruct the managed device to perform one or more of: deleting the target media file, playing the target media file, pausing playing of the target media file, and switching the target media file.

With reference to any one of the first aspect to the fifth possible implementation of the first aspect, in a sixth possible implementation of the first aspect, the method provided in this embodiment of the present invention further includes: receiving, by the terminal, a query request message that is sent by the managed device and that carries a preset query field, where the preset query field is used to query whether the terminal has the permission to download the candidate media file. Before storing the media stream, the managed device sends the query request message to the terminal to determine whether the terminal has permission to store the candidate media file. In this way, a problem of property right dispute due to private storage of the media stream by the managed device can be avoided.

With reference to any one of the first aspect to the sixth possible implementation of the first aspect, in a seventh possible implementation of the first aspect, this embodiment of the present invention further includes: sending, by the terminal to the managed device, a query instruction used to query whether the managed device has the storage capability, and receiving, by the terminal, a response instruction sent by the managed device, where the response instruction is used to indicate that the managed device has the storage capability. The terminal obtains the storage capability of the managed device, to determine whether the terminal has permission to manage the at least one media file, so that a problem that the managed device does not have the storage capability because the terminal sends the first message to the managed device when the managed device does not have the storage capability is avoided.

With reference to any one of the first aspect to the seventh possible implementation of the first aspect, in an eighth possible implementation of the first aspect, the query instruction carries a first parameter, and the first parameter is used to query whether the managed device has the storage capability. The response instruction carries a second parameter, and the second parameter is used to indicate that the managed device has the storage capability. The managed device can directly determine a purpose of the query instruction by using the first parameter. In addition, the second parameter can enable the terminal to directly determine whether the managed device has the storage capability.

According to a second aspect, an embodiment of this application provides a method for managing a managed device, where the method is applied to a managed device. The managed device is in communication connection to a terminal, and the managed device stores at least one media file and information corresponding to each media file. The method in this embodiment of this application includes: receiving, by the managed device by using a Bluetooth path established between the managed device and the terminal, a first request that is sent by the terminal and that is used to obtain at least one piece of media file information stored in the managed device; sending, by the managed device to the terminal, a first response including the at least one piece of media file information; receiving, by the managed device, a first operation instruction that is sent by the terminal and that is used to instruct the managed device to process a target media file according to a preset operation type, where the target media file is a media file indicated by any of the at least one piece of media file information sent to the terminal by the managed device; and processing, by the managed device, the target media file according to the preset operation type and the first operation instruction.

With reference to the second aspect, in a first possible implementation of the second aspect, the first operation instruction includes a file identifier and the preset operation type, the file identifier is used to uniquely identify the target media file, and the processing, by the managed device, the target media file according to the preset operation type and the first operation instruction includes: determining, by the managed device in the at least one media file based on the file identifier, the target media file associated with the file identifier; and processing, by the managed device, the target media file according to the preset operation type.

With reference to the second aspect or the first possible implementation of the second aspect, in a second possible implementation of the second aspect, the method provided in this embodiment of the present invention further includes: receiving, by the managed device, a first message that is sent by the terminal and that is used to instruct the managed device to store a media stream that is sent by the terminal and that is of a candidate media file, where the candidate media file is a file played by the terminal that is stored in the terminal; and storing, by the managed device based on the first message, the media stream that is sent by the terminal and that is of the candidate media file.

With reference to any one of the second aspect to the second possible implementation of the second aspect, in a third possible implementation of the second aspect, before the storing, by the managed device based on the first message, the media stream that is sent by the terminal and that is of the candidate media file, the method provided in this embodiment of the present invention further includes: sending, by the managed device to the terminal, a query request message carrying a preset query field, where the preset query field is used to query whether the terminal has permission to download the candidate media file.

With reference to any one of the second aspect to the third possible implementation of the second aspect, in a fourth possible implementation of the second aspect, the method provided in this embodiment of the present invention further includes: receiving, by the managed device, a query instruction sent by the terminal, where the query instruction is used to query whether the managed device has a storage capability; and sending, by the managed device, a response instruction to the terminal when determining that the managed device has the storage capability, where the response instruction is used to indicate that the managed device has the storage capability.

With reference to any one of the second aspect to the fourth possible implementation of the second aspect, in a fifth possible implementation of the second aspect, when determining that the managed device does not have the storage capability, the managed device sends, to the terminal, a response instruction used to indicate that the terminal does not have the storage capability.

According to a third aspect, an embodiment of this application provides a terminal. The terminal is in communication connection to a managed device. The terminal includes: a sending unit, configured to send, to the managed device, a first request used to obtain at least one piece of media file information stored in the managed device; a receiving unit, configured to receive a first response that is sent by the managed device and that includes the at least one piece of media file information; and a display unit, configured to display the at least one piece of media file information on the terminal based on the first response. The sending unit is further configured to send a first operation instruction to the managed device after the terminal obtains a first operation request for a target media file. The first operation instruction is used to instruct the managed device to process the target media file according to a preset operation type, and the target media file is a media file indicated by any of the at least one piece of media file information displayed on the terminal.

With reference to the third aspect, in a first possible implementation of the third aspect, the first operation instruction includes a file identifier and the preset operation type, the file identifier is used to uniquely identify the target media file, and the preset operation type is used to instruct the managed device to process the target media file according to the preset operation type.

With reference to the third aspect or the first possible implementation of the first aspect, in a second possible implementation of the third aspect, an obtaining unit is configured to obtain a second operation request that is for a candidate media file and that is used to instruct the terminal to store the candidate media file to the managed device. A playing unit is configured to play the candidate media file when it is determined that the terminal has permission to download the candidate media file. The sending unit is further configured to send, to the managed device, a first message used to instruct the managed device to store a media stream that is sent by the terminal and that is of the candidate media file.

With reference to any one of the third aspect to the second possible implementation of the third aspect, in a third possible implementation of the third aspect, the obtaining unit provided in this embodiment of this application is further configured to obtain whether the terminal has the permission to download the candidate media file. An updating unit is further configured to update a status of an operation item of the candidate media file to an enabled state when the terminal determines that the managed device has a storage capability and the terminal has the permission to download the candidate media file.

With reference to any one of the third aspect to the third possible implementation of the third aspect, in a fourth possible implementation of the third aspect, the obtaining unit is further configured to obtain item label information of the candidate media file. The sending unit is further configured to send the item label information of the candidate media file to the managed device.

With reference to any one of the third aspect to the fourth possible implementation of the third aspect, in a fifth possible implementation of the third aspect, the first operation instruction in this embodiment of this application is used to instruct the managed device to perform one or more of: deleting the target media file, playing the target media file, pausing playing of the target media file, and switching the target media file.

With reference to any one of the third aspect to the fifth possible implementation of the third aspect, in a sixth possible implementation of the third aspect, the receiving unit is further configured to receive a query request message that is sent by the managed device and that carries a preset query field, where the preset query field is used to query whether the terminal has the permission to download the candidate media file.

According to a fourth aspect, an embodiment of this application provides a managed device, including: a receiving unit, configured to receive, by using a Bluetooth path established between the managed device and a terminal, a first request that is sent by the terminal and that is used to obtain at least one piece of media file information stored in the managed device; a sending unit, configured to send a first response to the terminal, where the first response includes the at least one piece of media file information, the receiving unit is further configured to receive a first operation instruction that is sent by the terminal and that is used to instruct the managed device to process a target media file according to a preset operation type, and the target media file is a media file indicated by any of the at least one piece of media file information sent to the terminal by the managed device; and a processing unit, configured to process the target media file according to the preset operation type in the first operation instruction.

With reference to the fourth aspect, in a first possible implementation of the fourth aspect, the first operation instruction includes a file identifier and the preset operation type, the file identifier is used to uniquely identify the target media file, and the preset operation type is used to instruct the managed device to process the target media file according to the preset operation type. The processing unit is specifically configured to: determine, in at least one media file based on the file identifier, the target media file associated with the file identifier; and process the target media file according to the preset operation type.

With reference to the fourth aspect or the first possible implementation of the fourth aspect, in a second possible implementation of the fourth aspect, the receiving unit provided in this embodiment of this application is further configured to receive a first message that is sent by the terminal and that is used to instruct the managed device to store a media stream that is sent by the terminal and that is of a candidate media file. The processing unit is further configured to store, based on the first message, the media stream that is sent by the terminal and that is of the candidate media file.

With reference to any one of the fourth aspect to the second possible implementation of the fourth aspect, in a third possible implementation of the fourth aspect, the sending unit provided in this embodiment of this application is further configured to send, to the terminal, a query request message carrying a preset query field, where the preset query field is used to query whether the terminal has permission to download the candidate media file.

With reference to any one of the fourth aspect to the third possible implementation of the fourth aspect, in a fourth possible implementation of the fourth aspect, the processing unit is specifically configured to: when it is determined that the terminal has the permission to download the candidate media file, store, by the managed device to the managed device, the media stream that is sent by the terminal and that is of the candidate media file.

With reference to any one of the fourth aspect to the fourth possible implementation of the fourth aspect, in a fifth possible implementation of the fourth aspect, the receiving unit provided in this embodiment of this application is further configured to receive a query instruction sent by the terminal, where the query instruction is used to query whether the managed device has a storage capability. The sending unit is further configured to: when it is determined that the managed device has the storage capability, send, to the terminal, a response instruction used to indicate that the managed device has the storage capability.

With reference to any one of the fourth aspect to the fifth possible implementation of the fourth aspect, in a sixth possible implementation of the fourth aspect, the sending unit is further specifically configured to: when it is determined that the managed device does not have the storage capability, send, to the terminal, a response instruction used to indicate that the terminal does not have the storage capability.

According to a fifth aspect, an embodiment of this application provides a terminal, including: a memory, a processor, a bus, a short distance communications unit, and a communications interface. The memory stores code and data. The short distance communications unit, the processor, and the memory are connected by using the bus. The short distance communications unit is configured to enable the terminal to establish a connection to a managed device. The processor is configured to: send a first request to the managed device by using the communications interface, where the first request is used to obtain at least one piece of media file information stored in the managed device; and receive a first response that is sent by the managed device and that includes the at least one piece of media file information. The processor runs the code in the memory to be configured to: display the at least one piece of media file information on the terminal based on the first response, and obtain a first operation request for a target media file. The processor is further configured to send, to the managed device by using the communications interface, a first operation instruction used to instruct the managed device to process the target media file according to a preset operation type. The target media file is a media file indicated by any of the at least one piece of media file information displayed on the terminal.

With reference to the fifth aspect, in a first possible implementation of the fifth aspect, the first operation instruction includes a file identifier and the preset operation type, the file identifier is used to uniquely identify the target media file, and the preset operation type is used to instruct the managed device to process the target media file according to the preset operation type.

With reference to the fifth aspect or the first possible implementation of the fifth aspect, in a second possible implementation of the fifth aspect, the processor is further configured to: obtain a second operation request that is for a candidate media file and that is used to instruct to store the candidate media file to the managed device, and play the candidate media file when determining that the terminal has permission to download the candidate media file. The processor is further configured to send, to the managed device by using the communications interface, a first message used to instruct the managed device to store a media stream that is sent by the terminal and that is of the candidate media file.

With reference to any one of the fifth aspect to the second possible implementation of the fifth aspect, in a third possible implementation of the fifth aspect, the processor is further configured to: obtain whether the terminal has the permission to download the candidate media file, and update a status of an operation item of the candidate media file to an enabled state when determining that the managed device has a storage capability and the terminal has the permission to download the candidate media file.

With reference to the fifth aspect to the third possible implementation of the fifth aspect, in a fourth possible implementation of the fifth aspect, the processor is further configured to: obtain item label information of the candidate media file, and send the item label information of the candidate media file to the managed device by using the communications interface.

With reference to the fifth aspect to the fourth possible implementation of the fifth aspect, in a fifth possible implementation of the fifth aspect, the first operation instruction is used to instruct the managed device to perform one or more of: deleting the target media file, playing the target media file, pausing playing of the target media file, and switching the target media file.

With reference to any one of the fifth aspect to the fifth possible implementation of the fifth aspect, in a sixth possible implementation of the fifth aspect, the processor is further configured to receive, by using the communications interface, a query request message that is sent by the managed device and that carries a preset query field, where the preset query field is used to query whether the terminal has the permission to download the candidate media file.

According to a sixth aspect, an embodiment of this application provides a managed device, including: a memory, a processor, a bus, a short distance communications unit, and a communications interface. The memory stores code and data, and stores at least one media file and one piece of information corresponding to each media file. The short distance communications unit, the processor, and the memory are connected by using the bus. The short distance communications unit is configured to enable the managed device to establish a connection to the terminal. The processor is configured to: receive, by using the communications interface, a first request that is sent by the terminal and that is used to obtain at least one piece of media file information stored in the managed device, and send, to the terminal by using the communications interface, a first response including the at least one piece of media file information. The processor is further configured to: receive, by using the communications interface, a first operation instruction that is sent by the terminal and that is used to instruct the managed device to process a target media file base on a preset operation type, where the target media file is a media file indicated by any of the at least one piece of media file information sent to the terminal by the managed device; and process the target media file according to the preset operation type in the first operation instruction.

With reference to the sixth aspect, in a first possible implementation of the sixth aspect, the first operation instruction includes a file identifier and the preset operation type, the file identifier is used to uniquely identify the target media file, and the preset operation type is used to instruct the managed device to process the target media file according to the preset operation type. The processor is specifically configured to: determine, in the at least one media file based on the file identifier, the target media file associated with the file identifier; and process the target media file according to the preset operation type.

With reference to any one of the sixth aspect to the second possible implementation of the sixth aspect, in a third possible implementation of the sixth aspect, the processor is configured to receive, by using the communications interface, a first message that is sent by the terminal and that is used to instruct the managed device to store a media stream that is sent by the terminal and that is of a candidate media file, where the candidate media file is a file played by the terminal that is stored in the terminal. The processor is configured to store, based on the first message, the media stream that is sent by the terminal and that is of the candidate media file.

With reference to any one of the sixth aspect to the third possible implementation of the sixth aspect, in a fourth possible implementation of the sixth aspect, the processor is configured to send, to the terminal by using the communications interface, a query request message carrying a preset query field, where the preset query field is used to query whether the terminal has permission to download the candidate media file.

With reference to the sixth aspect to the fourth possible implementation of the sixth aspect, in a fifth possible implementation of the sixth aspect, the processor is specifically configured to: when determining that the terminal has the permission to download the candidate media file, store, to the managed device, the media stream that is sent by the terminal and that is of the candidate media file.

With reference to the sixth aspect to the fifth possible implementation of the sixth aspect, in a sixth possible implementation of the sixth aspect, the processor is further configured to receive, by using the communications interface, a query instruction sent by the terminal, where the query instruction is used to query whether the managed device has a storage capability. The processor is further configured to send a response instruction to the terminal by using the communications interface when determining that the managed device has the storage capability.

According to a seventh aspect, an embodiment of this application provides a computer-readable storage medium, including an instruction. When the instruction is run on a terminal, the terminal is caused to perform the method for managing a media file in a managed device according to any one of the first aspect to the seventh possible implementation of the first aspect. Alternatively, when the instruction is run on a managed device, the managed device is caused to perform the method for managing a media file in a managed device according to any one of the second aspect to the fifth possible implementation of the second aspect.

According to an eighth aspect, an embodiment of this application provides a computer program product including an instruction. When the instruction is run on a terminal, the terminal is caused to perform the method for managing a media file in a managed device according to any one of the first aspect to the seventh possible implementation of the first aspect. Alternatively, when the instruction is run on a managed device, the managed device is caused to perform the method for managing a media file in a managed device according to any one of the second aspect to the fifth possible implementation of the second aspect.

According to a ninth aspect, an embodiment of this application provides a communications system. The communications system includes the terminal according to any one of the third aspect to the seventh possible implementation of the third aspect and the managed device according to any one of the fourth aspect to the fifth possible implementation of the fourth aspect.

It may be understood that any of the method for managing a media file in a managed device, the computer storage medium, or the computer program product that is provided above is configured to perform the corresponding method provided above. Therefore, for beneficial effects that the method for managing a media file in a managed device, the computer storage medium, or the computer program product can achieve, refer to beneficial effects of the corresponding method provided above, and details are not described herein again.

DESCRIPTION OF EMBODIMENTS

Figure 1:
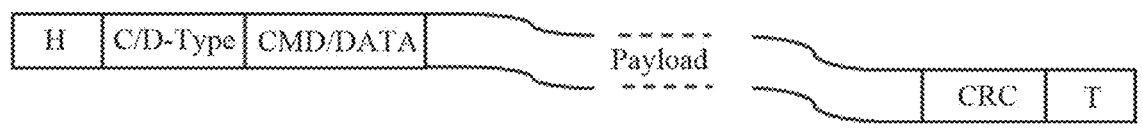
FIG. 1 shows a protocol format of a logical link control layer between a terminal and a managed device according to an embodiment of this application.

A conventional managed device (for example, a Bluetooth speaker) has no display interface. Therefore, a user cannot learn of, in real time, information about or a status of a media file stored in the managed device. In addition, in a conventional manner, the Bluetooth speaker is usually connected to a computer, to download an audio media file into the Bluetooth speaker. Alternatively, the Bluetooth speaker is connected to a computer, and at least one piece of media file information stored in the Bluetooth speaker is edited or deleted through an operation on the computer. This reduces usability of the Bluetooth acoustic equipment. Meanwhile, the conventional Bluetooth speaker can only passively receive a media stream sent by a terminal, perform analog-to-digital conversion on the media stream, and play the media stream. When the terminal plays an online media file, the Bluetooth acoustic equipment cannot store the online media file played by the terminal.

In a method for managing a media file in a managed device that is provided in embodiments of this application, during actual use, the managed device (for example, acoustic equipment) usually does not have a display capability and the terminal has the display capability. Therefore, in this application, the terminal may obtain, by using a Bluetooth path established between the terminal and the managed device, at least one piece of media file information stored in the managed device, and display, on the terminal by using the display capability of the terminal, the at least one piece of media file information stored in the managed device. In this way, at least one media file, for example, a name of the at least one media file, that is stored in the managed device or a sound image and a playing progress when the managed device plays a media file stored in the managed device may be displayed by using the display capability of the terminal. In addition, the terminal may further send, to the managed device based on trigger of a first operation request, a first operation instruction used to instruct the managed device to process a target media file according to a preset operation type, to be configured to instruct the managed device to process, according to the preset operation type, the target media file stored in the managed device, to manage the at least one media file stored in the managed device. In this way, usability of the managed device can be improved.

"Manage" in the embodiments of this application means that the terminal queries, by using the Bluetooth path established between the terminal and the managed device (for example, Bluetooth acoustic equipment), whether the Bluetooth acoustic equipment has a storage capability and performs one or more of playing, pause, fast-forward, fast-rewind, loop, and sound enhancement operations on at least one media file stored in the Bluetooth acoustic equipment.

A conventional management device (Controller Device, CT) (using a terminal as an example in the embodiments of this application) and a managed device (Target Device, TG) implement control of the TG by the CT by using an existing mechanism of a profile (profile) such as an Audio/Video Remote Control Profile (Audio/Video Remote Control Profile, AVRCP). A specific AVRCP protocol may be the AVRCP 1.4 or the AVRCP 1.6. An example in which the AVRCP protocol between the CT and the TG is the protocol AVRCP 1.6 is used for description in Table 1:

TABLE 1

List of control commands of a CT to a TG in a conventional protocol AVRCP 1.6

| PDU ID | PDU name (Name) | CMD TYPE | Description |
|---|---|---|---|
| 0x10 | GetCapabilities | AV/C STATUS AV/C STATUS | Obtain capabilities of the TG |
| 0x11 | ListPlayerApplicationSettingAttributes | AV/C STATUS | List setting attributes of a player |
| 0x12 | ListPlayerApplicationSettingValues | AV/C STATUS | List setting values of the player |
| 0x13 | GetCurrentPlayerApplicationSettingValue | AV/C STATUS | Obtain a setting value of the player |
| 0x14 | SetPlayerApplicationSettingValue | AV/C Ctrl | Set the setting value of the player |
| 0x15 | GetPlayerApplicationSettingAttributeText | AV/C STATUS | Obtain a setting attribute of the player |
| 0x16 | GetPlayerApplicationSettingValueText | AV/C STATUS | Obtain a setting parameter value of the player |
| 0x17 | InformDisplayableCharacterSet | AV/C Ctrl | Query a display capability of the player |
| 0x18 | InformBatteryStatusOfCT | AV/C Ctrl | Query a battery status of the player |
| 0x20 | GetElementAttributes | AV/C STATUS | Obtain element attributes of the player |
| 0x30 | GetPlayStatus | AV/C STATUS | Obtain a playing status |
| 0x31 | RegisterNotification | AV/C NOTIFY | Register notification |
| 0x40 | RequestContinuingResponse | AV/C Ctrl | Request a continuing response |
| 0x41 | AbortContinuingResponse | AV/C Ctrl | Abort the continuing response |
| 0x50 | SetAbsoluteVolume | AV/C Ctrl | Set a volume |
| 0x60 | SetAddressedPlayer | AV/C Ctrl | Set a player expected to be used |
| 0x71 | GetFolderItems (MediaPlayerList) | Browsing | Obtain a playlist |
| 0x75 | GetTotalNumberOfItems | Browsing | Obtain a number of to-be-played items |
| 0x70 | SetBrowsedPlayer | Browsing | Set a player expected to be queried |
| 0x72 | ChangePath | Browsing | Change a playing path |
| 0x73 | GetItemAttributes | Browsing | Obtain attributes of an extended definition item |
| 0x74 | PlayItem (Filesystem) | AV/C Ctrl | Play the extended definition item |

TABLE 1-continued

List of control commands of a CT to a TG in a conventional protocol AVRCP 1.6

| PDU ID | PDU name (Name) | CMD TYPE | Description |
|---|---|---|---|
| 0x75 | GetTotalNumberOfItems | Browsing | Obtain a number of items of the extended definition item |
| 0x80 | Search | Browsing | Search for a specific item |
| 0x90 | AddToNowPlaying | AV/C Ctrl | Dynamically add a to-be-played item |
| 0xA0 | General Reject | Browsing | TG exception |

It may be learned from Table 1 that requirements in the following scenarios cannot be satisfied in the conventional protocol AVRCP 1.6: 1. query of the CT whether the TG has a storage capability; 2. query of the TG whether the CT has permission to download and store a media file; 3. the CT cannot manage a media file on the TG side: and 4. the TG cannot store a media file currently played by the CT.

As shown in FIG. 1, FIG. 1 shows a protocol definition format between the terminal and the managed device in a conventional solution. In the conventional solution, how to set a virtual serial port and how to connect two Bluetooth devices (that is, a terminal and a managed device that have a Bluetooth function) are defined in a Serial Port Profile (Serial Port Profile, SPP). A Bluetooth SPP profile is equivalent to a wireless serial port. A user uses the wireless serial port as a physical layer transmission path (PHY-layer 1), and defines a private transmission protocol (for example, defining a private application layer protocol based on the profile SPP) on the physical layer transmission channel, to form a logical link control (Logical Link Control, LLC) layer (LLC-layer 2); and defines an application layer on the LLC layer, and completes a service in which transmission and control need to be completed. A possible protocol definition format is shown in FIG. 1:

In FIG. 1, a type of a C/D-Type definition frame is classified into two types: a data frame (DATA) and a command frame (CMD). For CMD/DATA, a type of the field is determined based on a definition of C/D-Type. If C/D-Type=CMD, the field is a control command. For example, the field may be defined as obtaining whether the TG has a storage capability, and other detailed information is defined in a Payload field. If C/D-Type=DATA, the field is a read/write command of data, for example, reading status information of a music media file stored in the TG. However, as shown in FIG. 1, defining the private application layer protocol based on the profile SPP is a private command, and a type of one field can only define one command. Consequently, an extension capability of the defining the private application layer protocol based on the profile SPP is insufficient. In addition, the private command requires that the two parties, namely, the CT/TG, can be supplied by only one supplier or together provided by different suppliers that sign a cooperation agreement. When private commands provided by different suppliers are different, the private commands have no commonality.

Figure 2:
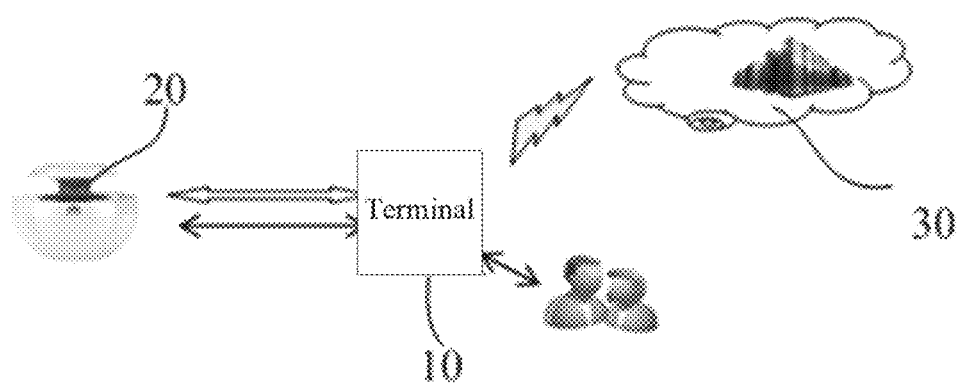
FIG. 2 is a diagram of a system architecture to which a method for managing a managed device is applied according to an embodiment of this application.

A diagram of a system architecture to which a method for managing a managed device according to an embodiment of this application is shown in FIG. 2. The diagram of the system architecture includes a terminal 10, a managed device 20, and a server 30. The terminal 10 and the managed device 20 are in communication connection; the terminal 10 and the server 30 are in communication connection.

The server 30 is configured to store an online media file, and the server 30 may be a cloud server. The terminal 10 and the server 30 may communicate with each other. For example, the terminal 10 may download the online media file from the server 30. Alternatively, the terminal 30 may determine, based on a request message of the terminal 10, whether the terminal has permission to store (download) an online media file.

The managed device 20 may be acoustic equipment, for example, a Bluetooth speaker, and the managed device 20 establishes a connection to the terminal 10. Specifically, the managed device 20 and the terminal 10 may establish the connection through Bluetooth. Therefore, the managed device 20 and the terminal 10 need to have a short distance communications unit, for example, a Bluetooth chip. The managed device 20 has a storage capability, and may be configured to store a media stream when the terminal plays a candidate media file. The managed device 20 may further manage, based on a management operation instruction (for example, a download instruction, a deletion instruction, or a playing instruction) delivered by the terminal, a media file stored in the managed device 20.

The managed device should have a memory. The memory may be possessed by the managed device or may be an external storage device connected to the managed device by using a communications interface.

The managed device 20 is further configured to play a media file played by the terminal 10 by running a player in the terminal 10.

The terminal 10 has a display capability and a function (for example, a player, where the player may be a player possessed by the terminal or a player installed in the terminal by using a third-party application) of playing a media file, and may synchronize a media file stored in the managed device 20, to load, to a media file list of the terminal 10, item label information of the media file stored in the managed device 20, and display the item label information.

The terminal 10 may play a media file in the media file list by using the player.

In a specific implementation process, the terminal in this embodiment of this application may be a mobile phone, a mobile computer, a tablet computer, a personal digital assistant (Personal Digital Assistant, PDA), a media player, a smart television, a smart wearable device (for example, a smartwatch, smart glasses, and a smart band), an e-reader, a handheld game console, an in-vehicle electronic device, a cloud server, or the like. The terminal has the display capability, the function of playing a media file, and a capability of connecting to the managed device.

For example, the terminal and the managed device in this embodiment of this application establish a Bluetooth path through Bluetooth. Bluetooth protocols supported by two parties, namely, the terminal and the managed device, may be the Bluetooth protocol AVRCP 1.4 or the Bluetooth protocol AVRCP 1.6, or even may be another Bluetooth protocol. This is not limited in this embodiment of this application.

To describe this application in detail, the Bluetooth protocol AVRCP 1.6 is used as an example for description in this application: In this embodiment of this application, to enable the terminal to manage the managed device, extended definition is performed on the AVRCP 1.6. The AVRCP protocol is usually applied to control and request of the managed device (for example, a Bluetooth speaker) and a control device (for example, the terminal). In this scenario, the managed device is referred to as a CT, and a management device is referred to as a TG. However, in this embodiment of this application, the roles are formally exchanged. The management device still serves as the TG, and the managed device serves as a role of the TG. That is, a regular AVRCP protocol specification is extended and reversely applied. A standard frame format definition of communication of a Bluetooth device is shown in Table 2. For detailed definitions of fields, refer to the Bluetooth protocol specification AVRCP 1.6.

TABLE 2

| Frame number | MSB (7) | 6 | 5 | 4 | 3 | 2 | 1 | LSB (0) |
|---|---|---|---|---|---|---|---|---|
| 0 | 0x0 | | | | | | | Ctype: 0x1 (STATES) |
| 1 | Subunit_type: 0x9 (PANEL) | | | | | | | Subunit_ID: 0x0 |
| 2 | Opcode: 0x0 (VENDOR DEPENDENT) | | | | | | | |
| 3-5 | Company ID: (0x001958, Bluetooth SIG registered Company ID) | | | | | | | |
| 6 | PDU ID (0x10-Get Capabilities) | | | | | | | |
| 7 | Reserved (0x00) | | | | | | | Packet Type (0x0) |
| 8-9 | Parameter Length (0x0001) | | | | | | | |
| 10 | Capability ID (0x1) | | | | | | | |

MSB represents the most significant bit (the Most Significant Bit), LSB represents the least significant bit (least significant bit). PDU represents a protocol data unit (Protocol Data Unit), and Packet Type represents a type of a data packet.

It should be noted that the frame format in Table 2 is merely an example. For a complete and detailed frame format definition, refer to the protocol AVRCP 1.6. For ease of description below, only the frame numbers 6-10 in Table 2 are described, as shown in Table 3.

TABLE 3

| Frame number | MSB (7) | 6 | 5 | 4 | 3 | 2 | 1 | LSB (0) |
|---|---|---|---|---|---|---|---|---|
| 0 | PDU ID | | | | | | | |
| 1 | Reserved | | | | | | | Packet Type |
| 2-3 | Parameter (parameter) and Length (length) | | | | | | | |
| 4-n | Capability ID (0x1) | | | | | | | |

It may be understood that to describe the frames 6-10 in Table 2, the frames 6-10 in Table 2 are renumbered in Table 3. Specifically, refer to Table 3.

In this embodiment of this application, a protocol data unit (Protocol Data Unit, PDU) ID in the conventional protocol AVRCP 1.6 is extended, and command words of an extended definition are shown in Table 4:

TABLE 4

| Extended PDU ID | | | |
|---|---|---|---|
| PDU ID | PDU Name | CMD TYPE | Description Description |
| 0xA0 | Remote Management Target | AV/C STATUS AV/C STATUS | Remote management of a managed device |

0xA0 represents a frame command word of the extended definition, and is used to negotiate a capability between a control device (the CT) and a controlled device (the TG).

In this embodiment of this application, to implement the method for managing a managed device, the conventional Bluetooth protocol AVRCP 1.6 is extended. A parameter parameter definition of an extended command word after extension is shown in Table 5:

TABLE 5

| Parameter (parameter) | Parameter name (Name) | Direction | Function description |
|---|---|---|---|
| 0x01 | Obtain a storage capability of a TG | CT → TG | Used by the CT to query whether the TG has a storage capability |
| 0x02 | Delete a target file | CT → TG | Used by the CT to delete a specified file in the TG |
| 0x03 | Delete a target directory in the TG | CT → TG | Delete a specified directory in the TG |
| 0x04 | Delete a target group in the TG | CT → TG | Delete a specified group in the TG |
| 0x10 | Obtain whether the CT has permission to download an online media file | TG → CT | Query whether the CT has the permission to download the online media file |

It may be understood that in this embodiment of this application, fields in the protocol AVRCP 1.6 are extended based on conventional Table 1. That is, parameters such as 0x01, 0x02, 0x03, 0x04, and 0x10 are added to implement extension of the protocol AVRCP 1.6. Specifically, a detailed definition format of the frame format of each parameter shown in Table 5 during actual use is shown in Table 6:

TABLE 6

Command for obtaining a storage capability of a TG

| Field | Parameter | Parameter Name | Size (byte) | Function description |
|---|---|---|---|---|
| 1 | 0x01 | Obtain a storage capability of a TG | 1 | Size (byte) |

The storage capability of the TG in this embodiment of this application means that the managed device has a read-only memory (Read-Only Memory, ROM) (where data is lost during power failure) instead of only simply decoding and playing an audio stream transferred from an external device.

For example, if the CT needs to obtain the storage capability of the TG, 0x01 is added to a query command sent to the TG by the CT In this way, after receiving the query command, the TG may feed back whether the TG has the storage capability, as a response message, to the CT. Similarly, when the TG makes a feedback to the query command of the CT, a format of the response message is shown in Table 7:

TABLE 7

Response message for obtaining a storage capability of a TG

| Field | Parameter | Size (byte) | Function description |
|---|---|---|---|
| 1 | 0x01 | 1 | Response to which subcommand |
| 2 | 0x00/0x01 | 1 | 0x00: indicating that a storage capability is not possessed<br>0x01: indicating that a storage capability is possessed |

For example, after receiving the query command carrying the parameter 0x01, the TG determines that the CT intends to obtain whether the TG has the storage capability. After the TG determines that the TG has the storage capability, the parameter 0x01 and a parameter 0x01 are added to the response message fed back to the CT by the TG, to indicate that the response message is a feedback made to the query command carrying 0x01 and the TG has the storage capability.

TABLE 8

Command for deleting a target file

| Field | Parameter | Parameter Name | Size (byte) | Function description |
|---|---|---|---|---|
| 1 | 0x02 | RemoveTargetFile (delete a target file) | 1 | Subcommand word |
| 2 | String | File name | 1-400 | Name of a to-be-deleted file, not maximally exceeding 400 bytes |

Parameter is a type of a character string (String), in other words, a string of characters, for example, 0x02 and 0x00, that includes a digit, an alphabet, and an underline.

TABLE 9

Response message for deleting a target file

| Field (Field) | Parameter | Size (byte/octets) | Function description |
|---|---|---|---|
| 1 | 0x02 | 1 | Response to which subcommand |
| 2 | 0x00/0x01 | 1 | 0x00: indicating that deletion of a target file fails<br>0x01: indicating that deletion of a target file succeeds |

For example, with reference to Table 8 and Table 9, when determining that the CT has permission to manage the TG, the CT sends a management operation command to the TG. The management operation command carries a parameter 0x02 and a name of a to-be-managed file. In this way, after receiving the management operation command that is sent by the CT and that carries 0x02 and the name of the to-be-managed file, the TG executes the management operation command, and makes, after executing the management operation command, a response to the management operation command sent by the CT For example, if the TG successfully deletes a file indicated by the CT, a parameter 0x01 and the parameter 0x02 are added to the response fed back to the CT by the TG. The parameter 0x02 indicates that the CT makes the response to the management operation command that is sent by the TG and that carries the parameter 0x02. Alternatively, if the TG fails to delete a file indicated by the CT, a parameter 0x00 and the parameter 0x02 are added to the response fed back to the CT by the TG.

TABLE 10

Command for deleting a target directory

| Field | Parameter | Parameter Name | Size (byte) | Function description |
|---|---|---|---|---|
| 1 | 0x03 | Delete a target directory | 1 | Subcommand word |
| 2 | String | Path name | 1-1024 | Name of a to-be-deleted path, not maximally exceeding 1024 bytes, where if a length of an entire frame exceeds 512, a giant frame processing manner in a protocol specification needs to be used |

TABLE 11

Response message for deleting a target directory

| Field (Field) | Parameter | Size (byte/octets) | Function description |
|---|---|---|---|
| 1 | 0x03 | 1 | Response to which subcommand |
| 2 | 0x00/0x01 | 1 | 0x00: indicating that deletion of a target directory fails 0x01: indicating that deletion of a target directory succeeds |

For example, with reference to Table 10 and Table 11, when determining that the CT has permission to manage the TG, the CT sends a management operation command to the TG. The management operation command carries a parameter 0x03 and a path name of a to-be-managed target directory. In this way, after receiving the management operation command that is sent by the CT and that carries the parameter 0x03 and the path name of the to-be-managed target directory, the TG executes the management operation command, and makes, after executing the management operation command, a response to the management operation command sent by the CT. For example, if the TG successfully deletes a target directory indicated by the CT, a parameter 0x01 and the parameter 0x03 are added to the response fed back to the CT by the TG. The parameter 0x03 indicates that the response message is a response made to the management operation carrying the parameter 0x03. If the TG fails to delete a target directory indicated by the CT, a parameter 0x00 and the parameter 0x03 are added to the response message fed back to the CT by the TG

TABLE 12

Command for deleting a target group

| Field | Parameter | Parameter Name | Size (byte) | Function description |
|---|---|---|---|---|
| 1 | 0x04 | Delete a target group | 1 | Subcommand word |
| 2 | String | Group name | 1-400 | Name of a to-be-deleted group, not maximally exceeding 400 bytes |

TABLE 13

Response message for deleting a target group

| Field (Field) | Parameter | Size (byte/octets) | Function description |
|---|---|---|---|
| 1 | 0x04 | 1 | Response to which subcommand |
| 2 | 0x00/0x01 | 1 | 0x00: indicating that deletion of a target group fails 0x01: indicating that deletion of a target group succeeds |

For example, with reference to Table 12 and Table 13, when determining that the CT has permission to manage the TG, the CT sends a management operation command to the TG. The management operation command carries a parameter 0x04 and a name of a to-be-managed target group. In this way, after receiving the management operation command that is sent by the CT and that carries the parameter 0x04 and the name of the to-be-managed target group, the TG executes the management operation command, and makes, after executing the management operation command, a response to the management operation command sent by the CT. For example, if the TG successfully deletes a target directory indicated by the CT, a parameter 0x01 and the parameter 0x04 are added to the response fed back to the CT by the TC, 0x04 indicates that the response message is a response made to the management operation carrying the parameter 0x04. If the TG fails to delete a target group indicated by the CT, a parameter 0x00 and the parameter 0x04 are added to the response fed back to the CT by the TG.

TABLE 14

Command for obtaining whether a CT has download permission

| Field | Parameter | Parameter Name | Size (byte) | Function description |
|---|---|---|---|---|
| 1 | 0x10 | Command for obtaining whether a CT has download permission | 1 | Subcommand word |

TABLE 15

Response for obtaining whether a CT has download permission

| Field (Field) | Parameter | Size (byte/octets) | Function description |
|---|---|---|---|
| 1 | 0x10 | 1 | Response to which subcommand |
| 2 | 0x00/0x01 | 1 | 0x00: indicating that a CT does not have download permission 0x01: indicating that a CT has download permission |

For example, with reference to Table 14 and Table 15, when receiving a request for storing, when receiving a media file played by the CT that is sent by the CT, a media stream corresponding to the media file, the TG sends, to the CT, a query command carrying a parameter 0x10. In this way, after receiving the query command sent by the TG, the CT executes the query command, and makes, after executing the query command, a response to the query command sent by the TG. For example, if the CT determines that the CT has download permission to the media file played by the CT, a parameter 0x01 and the parameter 0x10 are added to the response made to the TG by the CT. The parameter 0x10 carried in the response is used to indicate that the response made by the CT is for the query command carrying 0x10. If the CT determines that the CT does not have download permission to the media file played by the CT, a parameter 0x00 and the parameter 0x10 are added to the response made to the TG by the CT.

In conclusion, in the method for managing a managed device that is provided in this embodiment of this application, to achieve a function in the method, a conventional AVRCP command is extended. Specific extended content of the AVRCP command is shown in Table 4 to Table 15. During actual use, the method for managing a managed device that is provided in this embodiment of this application needs to be combined with the specification of the conventional protocol AVRCP 1.6, in other words, Table 1 is combined with the extended content of the AVRCP commands that is shown in Table 4 to Table 15.

Figure 3:
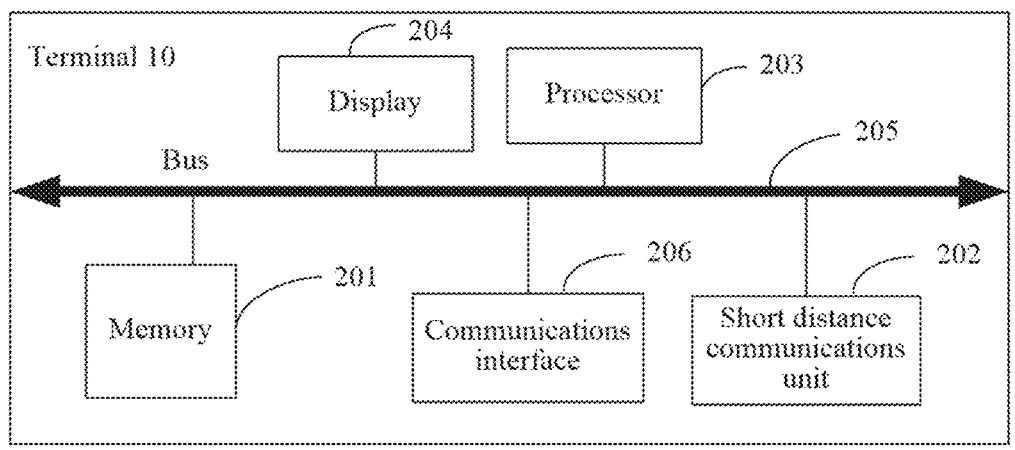
FIG. 3 is a schematic structural diagram 1 of a terminal according to an embodiment of this application.

As shown in FIG. 3, FIG. 3 is a schematic structural diagram of an example of a terminal according to an embodiment of this application. The terminal includes a memory 201, a short distance communications unit 202, a processor 203, a display 204, a communications interface

206, and a communications bus 205. The memory 201, the short distance communications unit 202, the communications interface 206, the processor 203, and the display 204 are connected by using the communications bus 205. The memory 201 is configured to store program code and data of the terminal 10. The short distance communications unit 202 is configured to support the terminal 10 in establishing a communications path, for example, a Bluetooth path, with another device (for example, a managed device). The communications interface 206 is configured to support the terminal 10 in communicating with the managed device by using the established communications path. The display 204 is configured to support the terminal in displaying media file information. The processor 203 is configured to support the terminal 10 in executing the program code and the data that are stored in the memory 201 to implement a method for managing a media file in a managed device that is provided in the embodiments of this application.

Figure 4:
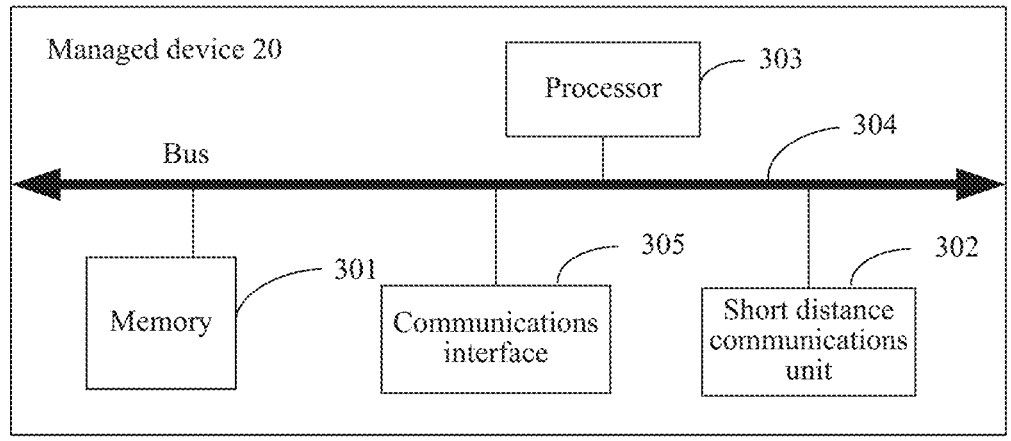
FIG. 4 is a schematic structural diagram 1 of a managed device according to an embodiment of this application.

As shown in FIG. 4. FIG. 4 is a schematic structural diagram of an example of a managed device 20 according to an embodiment of this application. The managed device 20 includes a memory 301, a short distance communications unit 302, a processor 303, a communications interface 305, and a communications bus 304. The memory 301, the short distance communications unit 302, the communications interface 305, and the processor 303 are connected by using the communications bus 304. The memory 301 is configured to store program code and data of the managed device 20. The short distance communications unit 302 is configured to support the managed device 20 in establishing a communications path with another device (for example, a terminal). The communications interface 305 is configured to support the managed device 20 in communicating with the terminal 10 by using the established communications path. The processor 203 is configured to support the managed device 20 in executing the program code and the data that are stored in the memory 301 to implement a method for managing a managed device that is provided in the embodiments of this application.

Optionally, an example in which the memory 301 is an internal memory of the managed device 20 is used for description in FIG. 4. During actual use, the memory 30 may alternatively be an internal storage device of the managed device, and is connected to the managed device 20 by using the communications interface.

For example, the short distance communications unit shown in FIG. 3 and FIG. 4 includes a Bluetooth chip and a radio frequency circuit.

It may be understood that when the terminal and the managed device that are in the embodiments of this application communicate with each other through Bluetooth, the terminal and the managed device both need to support a Bluetooth protocol, for example, the protocol AVRCP 1.6, the protocol AVRCP 1.4, or another Bluetooth protocol, provided that an AVRCP in the Bluetooth protocol includes an extended command in Table 4 to Table 15.

Figure 5:
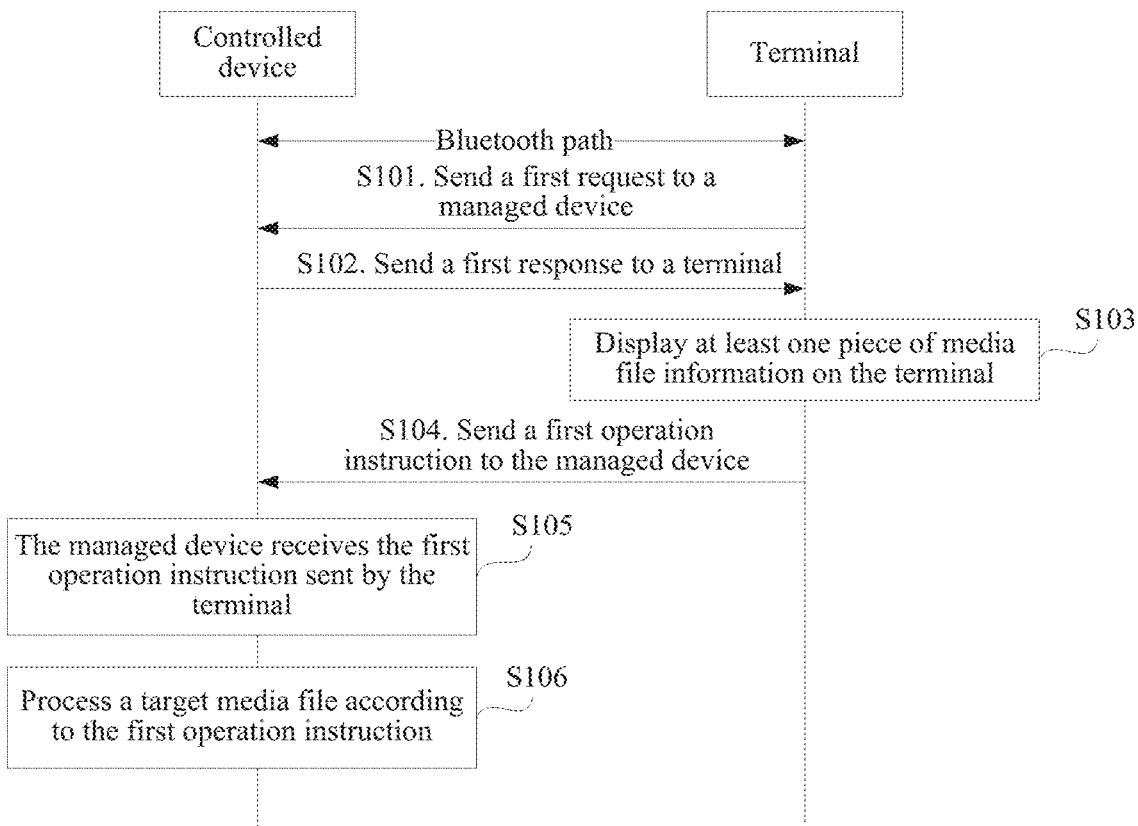
FIG. 5 is a schematic flowchart 1 of a method for managing a media file in a managed device according to an embodiment of this application.

As shown in FIG. 5. FIG. 5 is a schematic flowchart of a method for managing a managed device according to an embodiment of this application. As shown in FIG. 5, the method includes the following steps.

S101: A terminal sends, to a managed device by using a Bluetooth path between the terminal and the managed device, a first request used to obtain at least one piece of media file information stored in the managed device.

Specifically, the Bluetooth path established between the managed device and the terminal may be a path established based on the protocol AVRCP 1.6.

Specifically, after step S101, the method further includes: receiving, by the managed device, the first request, and sending a first response to the terminal.

S102: The terminal receives a first response sent by the managed device, where the first response includes the at least one piece of media file information stored in the managed device.

A media file in this embodiment of this application may be a music file, and the at least one piece of media file information may refer to item label information of each of at least one media file. The item label information may be ID3 information. The ID3 information is information such as a creator of a media file (for example, a singer of a music file, a composer of a music file, or a librettist of a music file), a title, an album name, a year, a style, lyrics of a music file, and an album picture of a music file.

S103: The terminal displays the at least one piece of media file information on the terminal based on the first response.

Optionally, step S103 may be specifically implemented by using the following manner: displaying, by the terminal in a media file list of the terminal, the item label information of each of the at least one media file stored in the managed device.

It may be understood that during actual implementation, the terminal may add, to the media file list, only a name of each media file stored in the managed device and a singer of the media file.

The media file list may be a media file list of a played possessed by the terminal, or may be a media file list of a player installed in the terminal by using a third-party application.

S104: The terminal obtains a first operation request for a target media file, and sends a first operation instruction to the managed device, where the first operation instruction is used to instruct the managed device to process the target media file according to a preset operation type, and the target media file is a media file indicated by any of the at least one piece of media file information displayed on the terminal.

Specifically, the first operation instruction is used to instruct the managed device to perform one or more of: deleting the target media file, fast-forwarding the target media file, editing information about the target media file, playing the target media file, pausing playing of the target media file, and switching the target media file.

It may be understood that when the first operation instruction is used to instruct to edit the information about the target media file, the first operation instruction further carries information obtained after the target media file is edited. For example, the terminal needs to edit a name of the target media file, and if the name of the target media file is a first name in a current status, the first operation instruction carries a second name. After receiving the first operation instruction, the managed device adjusts the name of the target media file from the first name to the second name.

Optionally, the first operation instruction includes a file identifier of the target media file and the preset operation type.

The file identifier is used to uniquely identify the target media file. For example, the file identifier may be the name of the target media file selected by using the first operation request or a storage address of the target media file in the managed device. The preset operation type is used to instruct the managed device to process the target media file according to the preset operation type.

Optionally, the preset operation type includes one or more of: deleting the target media file, playing the target media file, fast-forwarding the target media file, editing the information about the target media file, pausing playing of the target media file, and switching the target media file. Certainly, the preset operation type may further include another function, and details are not described herein in this application.

S105: The managed device receives the first operation instruction sent by the terminal.

S106: The managed device processes the target media file according to the preset operation type and the first operation instruction.

In the method for managing a media file in a managed device that is provided in this embodiment of this application, during actual use, the managed device (for example, acoustic equipment) usually does not have a display capability and the terminal has the display capability. Therefore, in this application, the terminal may obtain, by using the Bluetooth path established between the terminal and the managed device, the at least one piece of media file information stored in the managed device, and display, on the terminal by using the display capability of the terminal, the at least one piece of media file information stored in the managed device. In this way, information about the at least one media file, for example, a name of the at least one media file, that is stored in the managed device or a sound image and a playing progress when the managed device plays a media file stored in the managed device may be displayed by using the display capability of the terminal. In addition, the terminal may further send the first operation instruction to the managed device based on the obtained first operation request, to be configured to instruct the managed device to perform the preset operation type on the target media file, to manage the at least one media file stored in the managed device.

It may be understood that before step S101 in this embodiment of this application is performed, a communication connection has been established between the managed device and the terminal that are provided in this embodiment of this application. There may be a wired connection or a wireless connection, for example, a Bluetooth connection, between the managed device and the terminal. This is not limited in this embodiment of this application.

It may be understood that in this application, when S103 is performed, the terminal needs to obtain a storage capability of the managed device. Only when determining that the managed device has the storage capability, the terminal can display, on the terminal, the at least one piece of media file information stored in the managed device.

In this application, the terminal may obtain, in the following manner, whether the managed device has the storage capability:

For example, on one hand, the terminal sends the first request to the managed device. If determining that the first response that is sent by the managed device and that carries the at least one piece of media file information is received, the terminal determines that the managed device has the storage capability. If determining that the first response is not received, the terminal determines that the managed device does not have the storage capability.

On the other hand, before sending the first request to the managed device, the terminal first sends a query instruction to the managed device. The query instruction is used to query whether the managed device has the storage capability. If determining that a received query response sent by the managed device indicates that the managed device has the storage capability, the terminal determines, based on the query response, that the managed device has the storage capability. If determining that a received query response sent by the managed device indicates that the managed device does not have the storage capability, the terminal determines, based on the query response, that the managed device does not have the storage capability.

For example, the query instruction carries a first field, and the first field includes a first parameter. The first the parameter is used to query whether the managed device has the storage capability.

For example, the first parameter carried in the query instruction sent to the managed device by the terminal is a parameter 0x01 shown in Table 5. In this way, after receiving the first parameter, the managed device may feed back, to the terminal, whether the managed device has the storage capability. Specifically, as shown in Table 7, if the managed device determines that the managed device has the storage capability, the first field and a second field are added to the query response sent to the terminal by the managed device. The first field carries a parameter 0x01, and the second field carries a parameter 0x01. The parameter 0x01 in the first field is used to indicate that the query response sent by the managed device is for the query instruction sent by the terminal. The parameter 0x01 in the second field is used to indicate that the managed device has the storage capability. For another example, if the managed device determines that the managed device does not have the storage capability, the first field and a second field are added to the query response sent to the terminal by the managed device. In this case, the second field carries a parameter 0x00, and the parameter 0x00 in the second field is used to indicate that the managed device does not have the storage capability.

It may be understood that the sending, by a terminal, a first request to a managed device in step S101 specifically includes: sending, by the terminal, the first request to the managed device if determining that a synchronization request operation is generated on the terminal; or sending, by the terminal, the first request to the managed device in a process of establishing the Bluetooth path with the managed device. This is not limited in this application.

Figure 6:
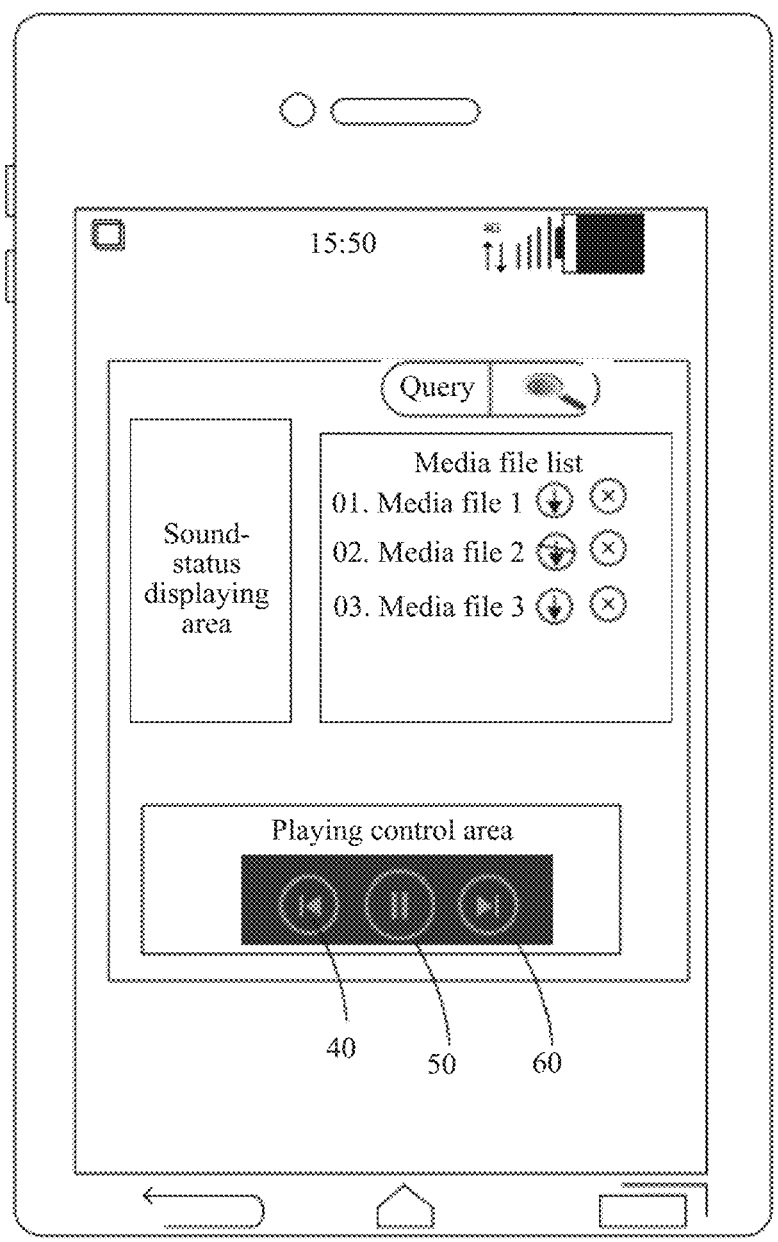
FIG. 6 is a schematic structural diagram 1 of synchronization of a media file in a managed device by a terminal according to an embodiment of this application.

For example, as shown in FIG. 6, an example in which the terminal displays the at least one piece of media file information in the media file list of the terminal is used in this application. A player runs on the terminal, and a display interface of the player has the media file list, a synchronization button, a playing control area, and a dynamic sound-status displaying area. The media file list is used to display information about each media file, for example, a title of the media file. Each media file corresponds to at least one operation item. Each of the at least one operation item corresponds to an operation function. Each operation item is further used to prompt for an operation function performed on the media file. The operation item may be one or more of a storage or deletion operation item, a playing operation item, and a pause operation item. The playing control area includes a switching button 40, a switching button 60, and a playing/playing pause button 50.

It may be understood that if detecting that a touch operation/tap operation is generated on any of the at least one operation item, the terminal determines that the terminal obtains the first operation request for the target media file. For example, if detecting that a touch operation is generated on the deletion operation item, the terminal determines that the target media file is triggered by the first operation request. In this case, an operation type carried in the first operation instruction sent to the managed device by the terminal is an operation function corresponding to the deletion operation item.

If determining that a touch operation/or tap operation is generated on the synchronization button, the terminal determines that the terminal is triggered by a synchronization request. In this case, the terminal may load, to the media file list, the ID3 information that is of the at least one media file and that is stored in the managed device.

For example, as shown in FIG. 6, FIG. 6 shows the at least one media file, for example, a media file 1, a media file 2, and a media file 3, that is displayed in the media file list before the touch operation/or tap operation is not generated on the synchronization button (where it may be understood that a candidate media file in the media file list of the terminal includes an online media file or may include a local media file; the online media file is a media file stored in a server; the local media file is a media file stored in a memory of the terminal, may be a media file possessed by the terminal, or may be a media file that is downloaded by the terminal from the server based on an operation request and that is stored in the terminal).

Figure 7:
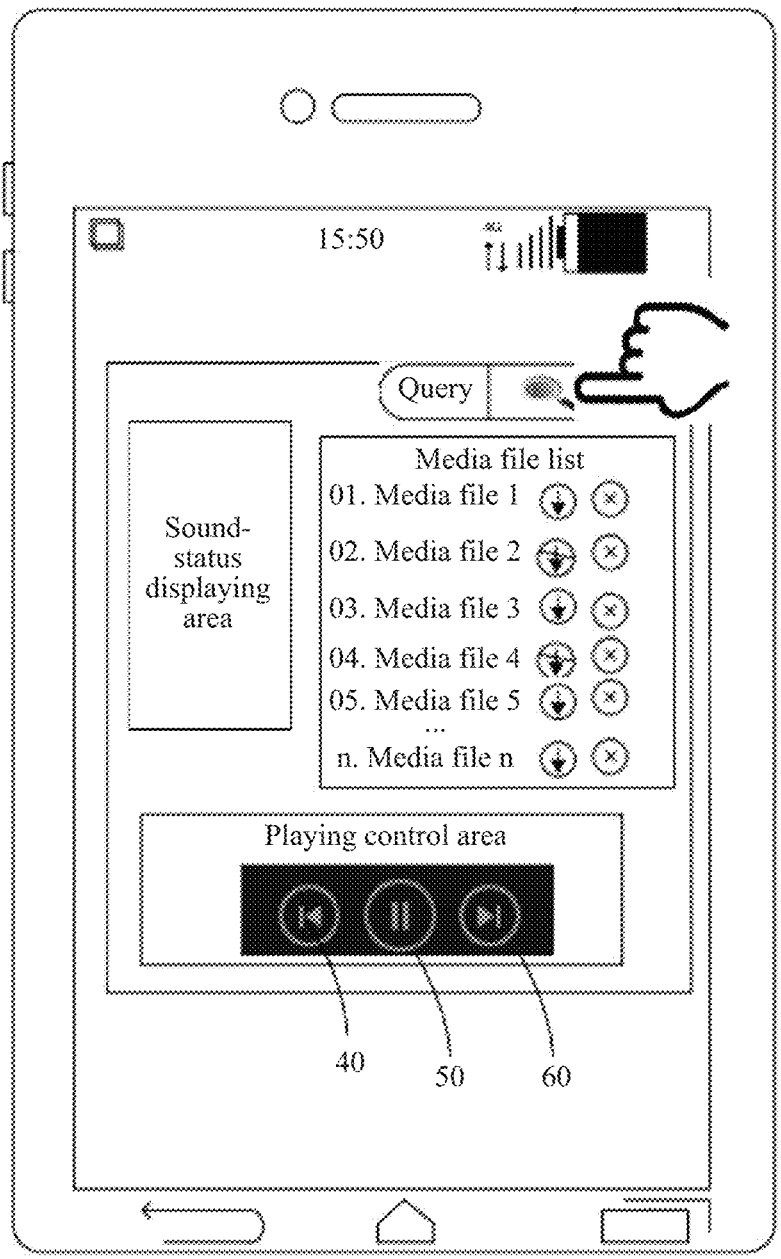
FIG. 7 is a schematic structural diagram 2 of synchronization of a media file in a managed device by a terminal according to an embodiment of this application.

FIG. 7 is a schematic diagram of displaying, by the terminal by using the media file list, the at least one piece of media file information stored in the managed device, after the touch operation/or tap operation is generated on the synchronization button. As shown in FIG. 7, a media file 4, a media file 5, . . . , and a media file n are the ID3 information that is of the at least one media file and that is stored in the managed device.

Optionally, in this embodiment of this application, the terminal sends the first operation instruction to the managed device by using the Bluetooth path established between the terminal and the managed device. The first operation instruction is used to instruct the managed device to perform, according to the preset operation type, any one of the following operations: for example, editing, playing, pause, fast-forward, fast-rewind, loop, and sound enhancement control, on the target media file associated with the file identifier. Specifically, for an operation performed on the media file, an actual case and an instruction of the operation type in the first operation instruction need to be referenced. For the instruction of each operation type, refer to Table 1 to Table 15.

It may be understood that each operation type corresponds to a parameter, that is, the first operation instruction only needs to carry the file identifier and the parameter corresponding to the operation type. In this way, when receiving a parameter carried in the first operation instruction, the managed device may determine an operation type that needs to be performed and that corresponds to the parameter.

It should be noted that before the terminal sends the first operation instruction to the managed device, the terminal and the managed device have determined a correspondence between an instruction and an operation type and a correspondence between a parameter and an operation type. Specifically, the correspondence between each instruction and an operation type may be shown in Table 1 to Table 15.

If collecting an operation request generated on a management button, the terminal may determine that the terminal obtains the first operation request. The management button includes at least one sub-button, for example, a deletion button, a disable button, and an enable button that are shown in FIG. 6 and FIG. 7. Each of the at least one sub-button corresponds to a first operation instruction. One operation instruction corresponds to one operation type, for example, at least one of a deletion, a disabling, and an enabling function.

For example, the deletion button in this embodiment of this application corresponds to a deletion operation instruction, and the playing button corresponds to a playing operation instruction.

It may be understood that the information that is about the media file and that is displayed in the media file list includes both ID3 information that is of a media file and that is stored in the terminal and ID3 information that is of one or more candidate media files and that is stored in the managed device. Therefore, the terminal may directly manage or indirectly manage the media file based on a storage location of the media file selected by using the first operation request generated on the management button. For example, if the target media file selected by using the first operation request is stored in the terminal, the terminal may directly perform any one of operations such as deletion, playing pause or playing, and switching on the media file. If determining that the target media file selected by using the first operation request is stored in the managed device, the terminal needs to send the first operation instruction to the managed device, so that the managed device manages, according to the first operation instruction, the at least one media file stored in the managed device.

For example, if the terminal collects that the first operation request is generated on the deletion button, and the target media file selected by using the first operation request is stored in the managed device, the terminal sends the deletion operation instruction to the managed device.

It may be understood that for a parameter carried in a command sent to the managed device when the terminal controls playing of the media file in the managed device, refer to Table 1, and details are not described herein in this embodiment of this application again.

Figure 8:
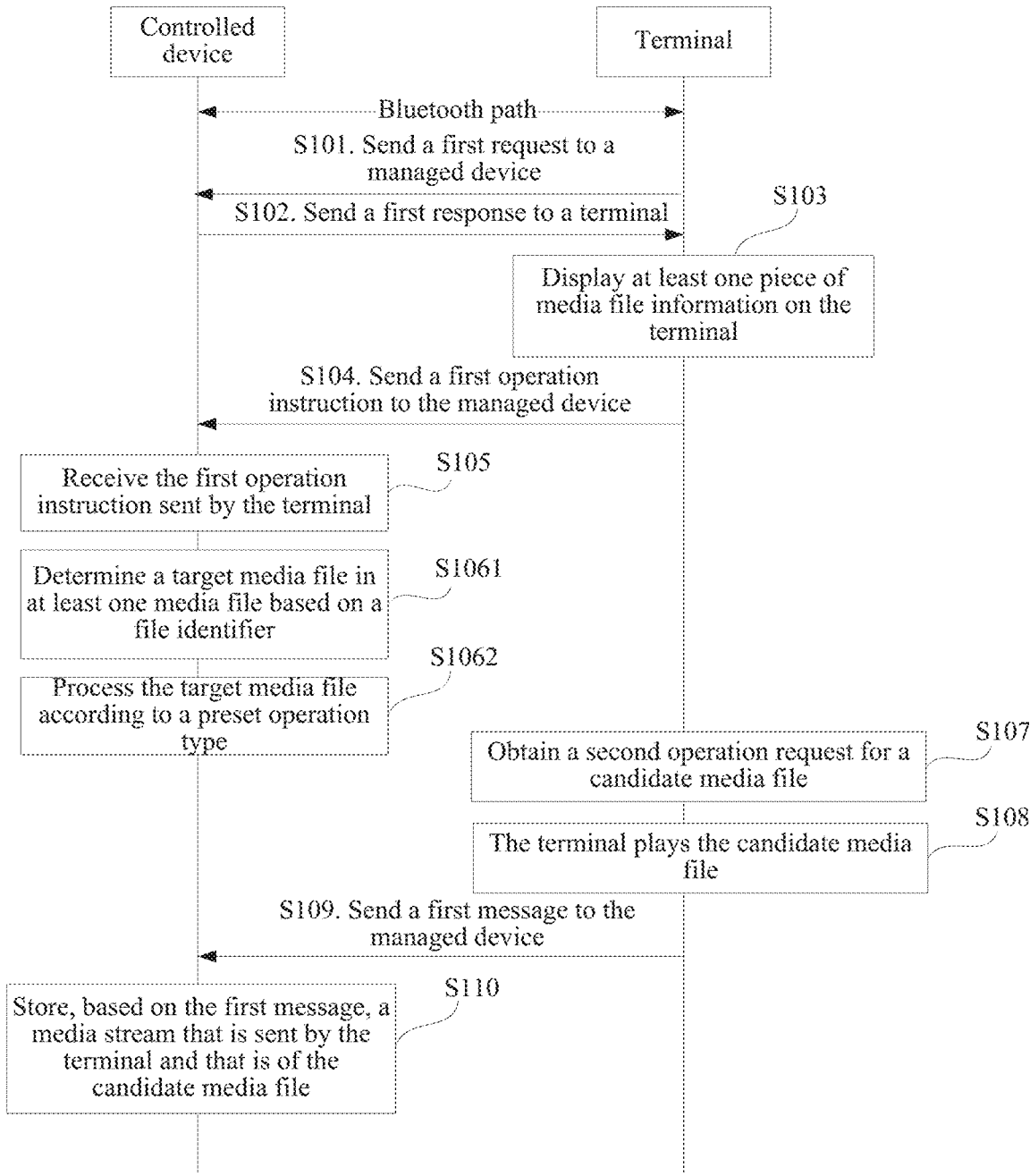
FIG. 8 is a schematic flowchart 2 of a method for managing a media file in a managed device according to an embodiment of this application.

Optionally, as shown in FIG. 8, step S106 in this application may be specifically implemented in the following manner:

S1061: The managed device determines, in at least one media file based on the file identifier, the target media file associated with the file identifier.

S1062: The managed device processes the target media file according to the preset operation type.

Optionally, as shown in FIG. 8, the method provided in this embodiment of this application further includes the following steps.

S107: The terminal obtains a second operation request for a candidate media file, where the second operation request is used to instruct the terminal to store the candidate media file to the managed device.

Optionally, the candidate media file may be a media file stored in the terminal or an online media file (a media file that is stored in the server and that is displayed on the terminal).

S108: The terminal plays the candidate media file when determining that the terminal has permission to download the candidate media file.

It may be understood that in this application, the terminal may play the candidate media file from a preset location of the candidate media file. The preset location in this embodiment of this application may be an initial location (a start location) of the candidate media file, or may be any time point in a playing time sequence of the target candidate media file. This is not limited in this embodiment of this application.

For example, if determining that the preset location is an initial location, the terminal controls the candidate media file to be played by starting from the start location of the candidate media file. In this way, a media stream that is sent to the managed device by the terminal and that is of the candidate media file also starts from the initial location of the candidate media file.

If determining that the preset location is any time point T, the terminal controls the candidate media file to be played by starting from the time point T as a start location. In this way, a media stream that is sent to the managed device by the terminal and that is of the candidate media file also starts from the time point T of the candidate media file.

For example, in an actual process, to enable the managed device to store a complete media stream of the candidate media file, the preset location is usually the initial location of the candidate media file.

It may be understood that the terminal starts to play the target candidate media file from the preset location, and sends the media stream of the candidate media file to the managed device, so that the managed device stores the media stream of the candidate media file.

For example, if detecting that the operation request is generated on the enable button shown in FIG. 7 or FIG. 6, the terminal determines that the second operation request for the candidate media file is obtained. In this case, when determining that a state of the candidate media file is a downloaded state, the terminal controls the candidate media file to be played by starting from the initial location. This case is applicable to a scenario in which in a process of playing the candidate media file by the terminal, a user expects that the candidate media file can be locally stored in the managed device and subsequently played.

S109: The terminal sends a first message to the managed device, where the first message is used to instruct the managed device to store a media stream that is sent by the terminal and that is of the candidate media file.

S110: The managed device stores, based on the first message, the media stream that is sent by the terminal and that is of the candidate media file.

Figure 9:
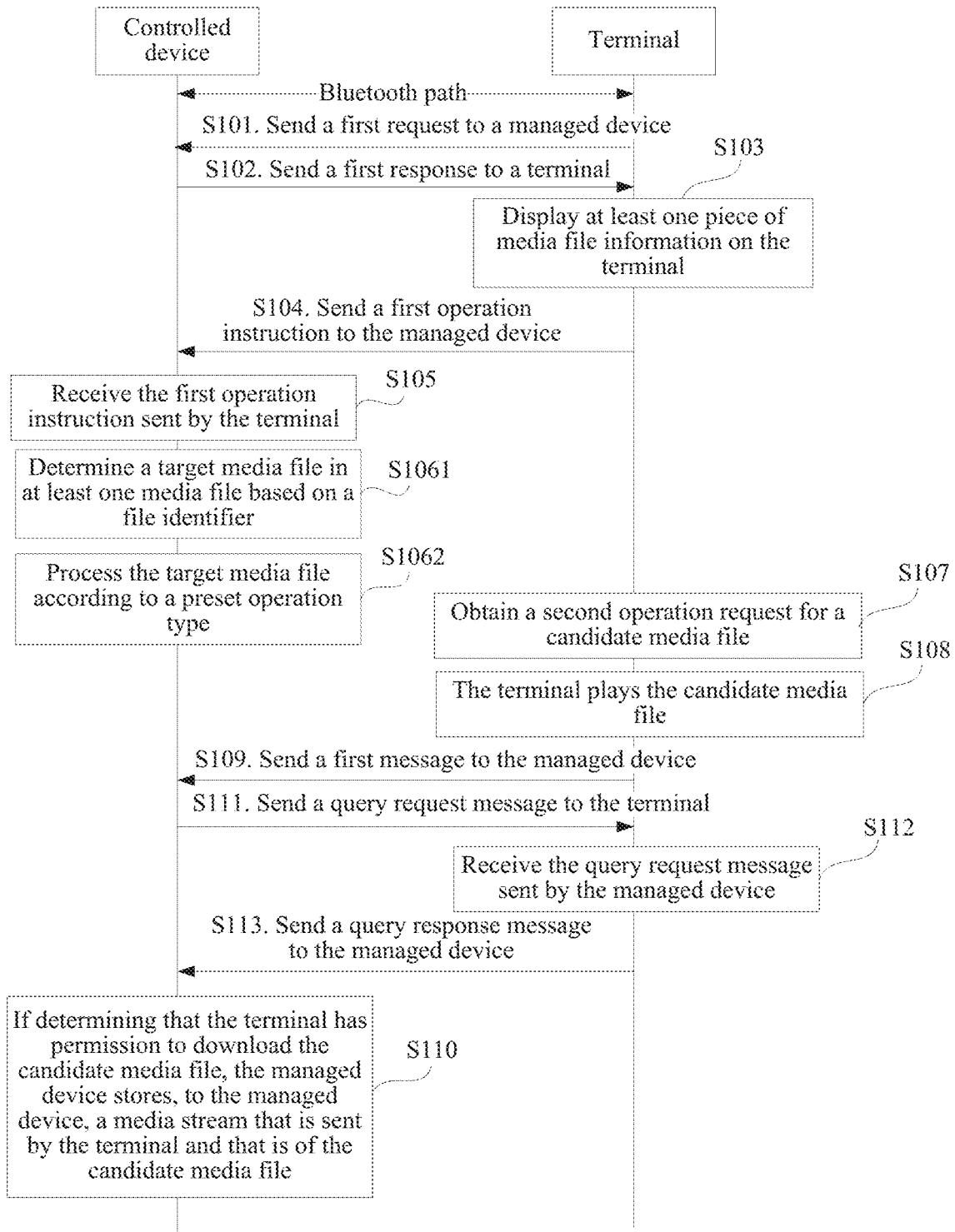
FIG. 9 is a schematic flowchart 3 of a method for managing a media file in a managed device according to an embodiment of this application.

Optionally, with reference to FIG. 8, as shown in FIG. 9, before step S110, the method provided in this embodiment of this application further includes the following steps.

S111: The managed device sends a query request message to the terminal, where the query request message carries a preset query field, and the preset query field is used to query whether the terminal has the permission to download the candidate media file.

Optionally, the query request message carries a file identifier of the candidate media file, and the file identifier is used to uniquely identify the candidate media file. For example, the file identifier of the candidate media file may be label information of the candidate media file.

S112: The terminal receives the query request message sent by the managed device.

S113: The terminal sends a query response message to the managed device, where the query response message is used to indicate that the terminal has the permission to download the candidate media file or indicate that the terminal does not have the permission to download the candidate media file.

Specifically, for content of the query response message, an actual case needs to be referenced. This is not limited in this embodiment of this application.

As shown in Table 14, the preset query field is a field 1 in Table 14. The field 1 carries a parameter (Parameter) 0x10. That is, the query request message carries the parameter 0x10. The parameter 0x10 carried in the query request message is used for a command for obtaining whether the terminal has the download permission.

It may be understood that when determining that the terminal has the permission to download the candidate media file, a field 1 and a field 2 that are shown in Table 15 are added to the query response message sent to the managed device by the terminal. The field 1 carries a parameter 0x10, and the field 2 carries a parameter 0x01 or 0x00. The parameter 0x10 is used to indicate that the query response message is a response made to the query request message carrying the parameter 0x10. The parameter 0x00 is used to indicate that the terminal does not have the permission to download the target candidate media file. The parameter 0x01 is used to indicate that the terminal has the permission to download the target candidate media file. When the terminal determines that the terminal does not have the permission to download the candidate media file, the parameter 0x00 is added to the field 2 in the query response message sent to the managed device by the terminal. When the terminal determines that the terminal has the permission to download the candidate media file, the parameter 0x10 is added to the field 2 in the query response message sent to the managed device by the terminal.

Optionally, as shown in FIG. 9, on one hand, when the managed device determines that the terminal has the permission to download the candidate media file, step S110 may further be implemented in the following manner: if determining that the terminal has the permission to download the candidate media file, storing, by the managed device to the managed device, the media stream that is sent by the terminal and that is of the candidate media file.

On the other hand, when the managed device determines that the terminal does not have the permission to download the candidate media file, step S110 may further be implemented in the following manner: skipping, by the managed device, storing the media stream that is sent by the terminal and that is of the candidate media file, and sending a feedback message to the terminal. The feedback message is used to inform that the terminal does not have the permission to download or store the candidate media file and therefore the managed device does not perform a storage operation on the media stream of the candidate media file.

It may be understood that the managed device may directly store, based on the first message, the media stream that is sent by the terminal and that is of the candidate media file being played. In this case, steps S111 to S113 may be omitted. Alternatively, S110 may be performed after S111 to S113 are performed. A purpose for doing this is that property right dispute because the managed device stores a media file without permission can be avoided.

Figure 10:
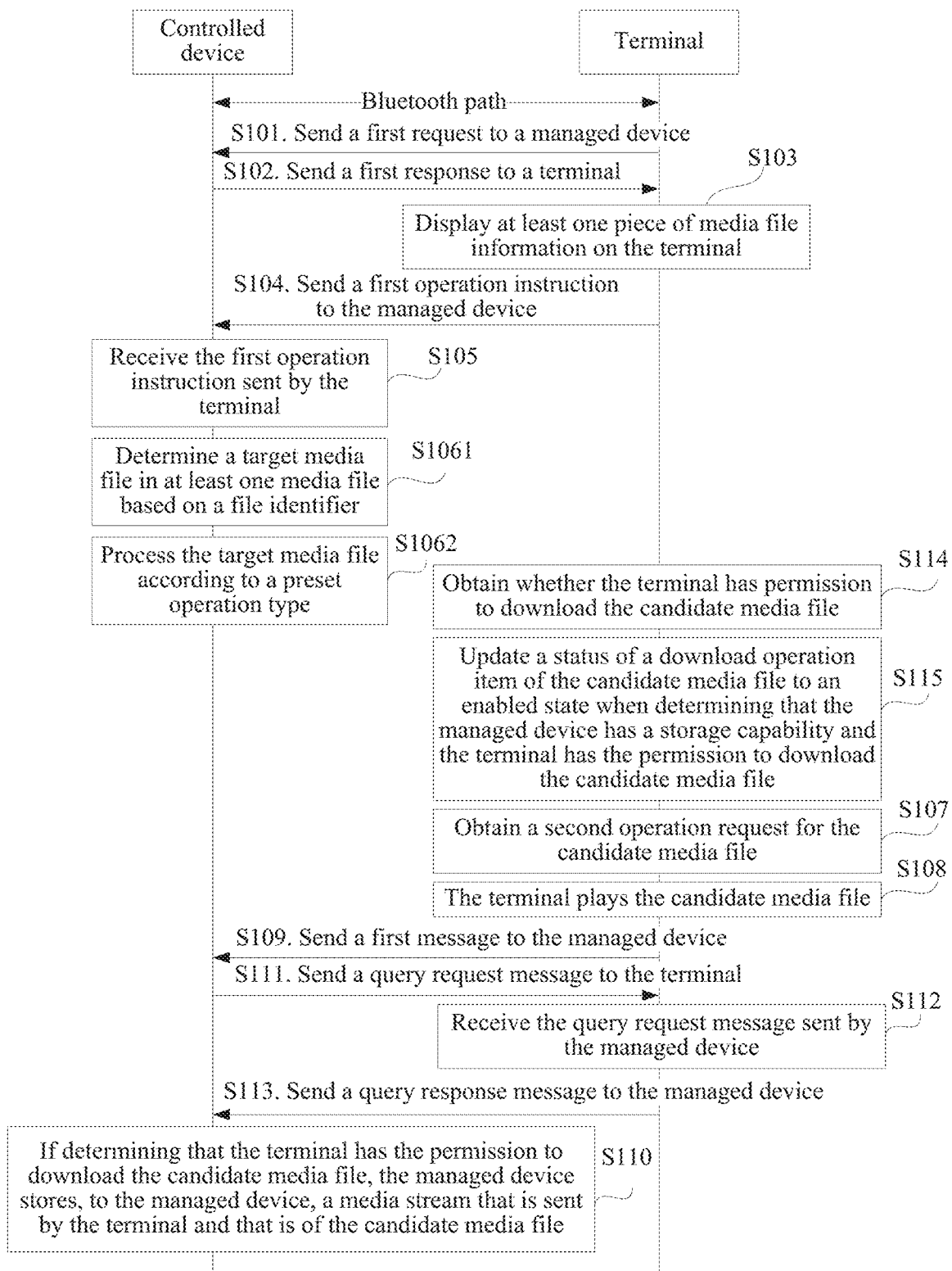
FIG. 10 is a schematic flowchart 4 of a method for managing a media file in a managed device according to an embodiment of this application.

Optionally, as shown in FIG. 10, before the terminal performs S107, the method provided in this embodiment of this application further includes the following steps.

S114: The terminal obtains whether the terminal has the permission to download the candidate media file.

Optionally, if the candidate media file is an online media file, the terminal can obtain, from the server storing the online media file, whether the terminal has permission to manage the candidate media file.

S115: The terminal updates a status of an operation item of the candidate media file to an enabled state when determining that the managed device has the storage capability and the terminal has the permission to download the candidate media file.

Alternatively, the terminal updates a status of an operation item of the candidate media file to a disabled state when determining that the managed device does not have the storage capability or the terminal does not have the permission to download the candidate media file. It may be understood that the operation item in this application may also be referred to as a storage operation item, a playing operation item, or a download operation item.

It may be understood that a download state in this application may be referred to as the enabled state. That a status of an operation item of a candidate media file is an enabled state indicates that the terminal has permission to download or store or play the candidate media file to Bluetooth acoustic equipment.

That a status of an operation item of a candidate media file is a disabled state indicates that the terminal does not have permission to download or store or play the candidate media file.

Optionally, before the terminal performs S109, the method provided in this embodiment of this application further includes the following steps.

S116: The terminal obtains item label information of the candidate media file.

Optionally, step S116 may be specifically implemented in the following manner:

S116a: If determining that the candidate media file is an online media file, the terminal obtains the item label information of the candidate media file from a server storing the online media file.

Alternatively, S116b: If determining that the candidate media file is a local media file, the terminal may directly obtain, from a server of the terminal, the item label information corresponding to the candidate media file.

S117: The terminal sends the item label information of the candidate media file to the managed device.

Optionally, the method provided in this embodiment of this application further includes the following steps.

S118: The managed device receives the item label information that is sent by the terminal and that is of the candidate media file.

S119: The managed device encodes the item label information of the target candidate media file to a format of the media stream of the candidate media file.

It may be understood that in this embodiment of this application, after receiving the media stream sent by the terminal, the managed device may directly store the received media stream in a memory of the managed device, or may encode the media stream and then store the media stream in a memory of the managed device.

The solution provided in this application is described mainly from a perspective of interaction between the terminal and the managed device. It may be understood that to achieve the foregoing functions, the terminal, the managed device, and the like include corresponding hardware structures and/or software modules for performing the functions. A person skilled in the art may be easily aware that in this application, examples of the terminal, the managed device, and the method steps that are described with reference to the embodiments disclosed in this specification may be implemented in a hardware form or a form of a combination of hardware and computer software. Whether a function is performed by hardware or by computer software driving hardware depends on particular applications and design constraint conditions of the technical solutions. A person skilled in the art may use different methods to implement the described functions for each particular application, but it should not be considered that the implementation goes beyond the scope of this application.

In the embodiments of the present invention, function module division may be performed on the terminal, the managed device, and the like based on the foregoing method example. For example, function modules corresponding to the functions may be divided into. Alternatively, two or more functions may be integrated into a processing module. The integrated module may be implemented in a form of hardware, or may be implemented in a form of a software function module. It should be noted that module division in the embodiments of this application is an example and is merely logical function division. During actual implementation, there may be another division manner.

Figure 11:
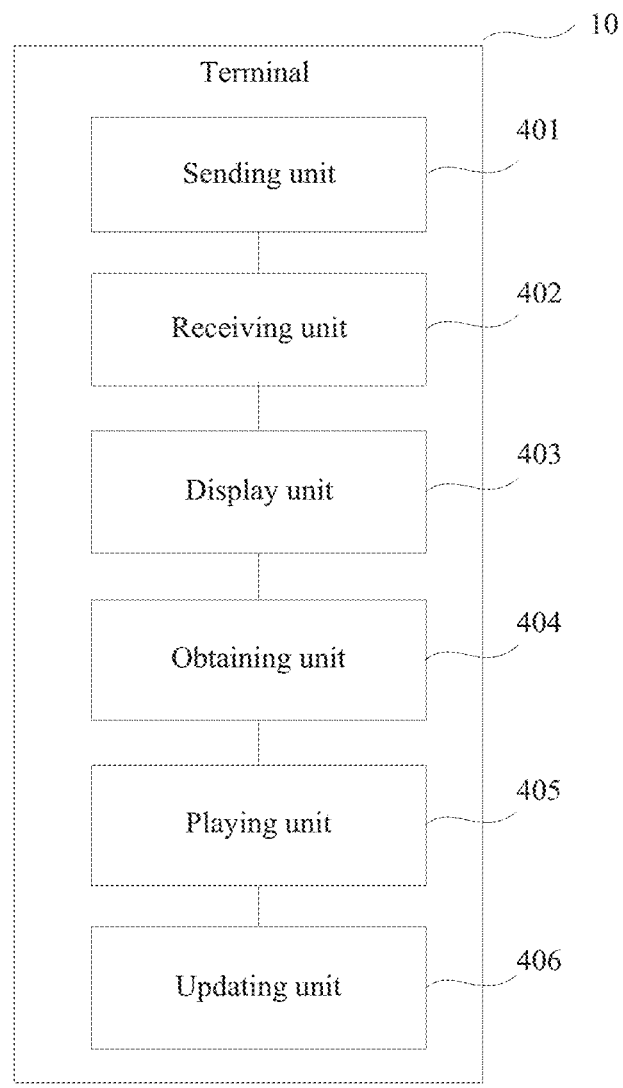
FIG. 11 is a schematic structural diagram 2 of a terminal according to an embodiment of this application.

When function modules corresponding to functions are divided into, FIG. 11 is a possible schematic structural diagram of a terminal according to the foregoing embodiment. The terminal 10 includes a sending unit 401, a receiving unit 402, a display unit 403, and an obtaining unit 404. The sending unit 401 is configured to support the terminal 10 in performing steps S101, S109, S113, and S117 in the foregoing embodiment. The receiving unit 402 is configured to support the terminal 10 in performing steps S102 and S112 in the foregoing embodiment. The display unit 403 is configured to support the terminal 10 in performing step S103 in the foregoing embodiment. The obtaining unit 404 is configured to support the terminal 10 in performing steps S104, S107, S114, and S116 (specifically S116a and S116b) in the foregoing embodiment. In addition, the terminal 10 further includes: a playing unit 405, configured to support the terminal 10 in performing step S108 in the foregoing embodiment; and an updating unit 406, configured to support the terminal in performing step S115 in the foregoing embodiment. All related content of the steps in the foregoing method embodiment may be quoted to functional descriptions of corresponding function modules, and details are not described herein again.

In the terminal provided in this embodiment of this application, during actual use, a managed device (for example, acoustic equipment) usually does not have a display capability and the terminal has the display capability. Therefore, in this application, the terminal may obtain, by using a Bluetooth path established between the terminal and the managed device, at least one piece of media file information stored in the managed device, and display, on the terminal by using the display capability of the terminal, the at least one piece of media file information stored in the managed device. In this way, the at least one piece of media file information, for example, a name of at least one media file, that is stored in the managed device or a sound image and a playing progress when the managed device plays a media file stored in the managed device may be displayed by using the display capability of the terminal. In addition, the terminal may send, to the managed device based on trigger of a first operation request, a first operation instruction including a file identifier and a preset operation type, to instruct the managed device to perform the preset operation type on a target media file associated with the file identifier, to manage the at least one media file stored in the managed device. In this way, usability of the managed device can be improved.

Specifically, in hardware implementation, the sending unit 401 and the receiving unit 402 may be integrated together to form a communications interface of a terminal shown in FIG. 3. The display unit 403 may be a display of the terminal shown in FIG. 3. The obtaining unit 404, the playing unit 405, and the updating unit 406 may be integrated into a processor of the terminal 10 shown in FIG. 3.

Figure 12:
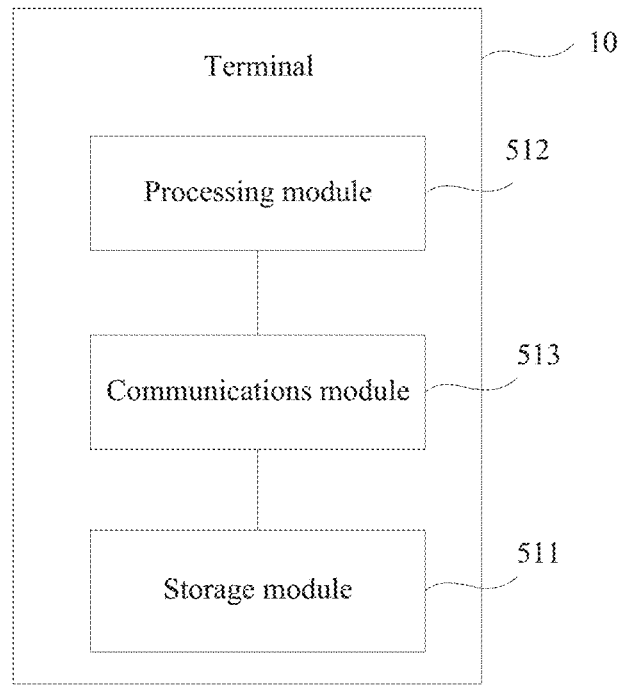
FIG. 12 is a schematic structural diagram 3 of a terminal according to an embodiment of this application.

When an integrated unit is used, FIG. 12 is a possible schematic diagram of a logical structure of a terminal 10 according to the foregoing embodiment. The terminal 10 includes a processing module 512 and a communications module 513. The processing module 512 is configured to perform control management on actions of the terminal 10. For example, the processing module 512 is configured to perform steps S101, S109, S113, S117, S102, S112, S103, S104, S107, S114, S116 (specifically S116a and S116b), S108, and S115 in the foregoing embodiment. Specifically, for an order of performing the foregoing steps by the terminal, refer to the foregoing embodiment, and details are not described herein in this application again. And/or another process performed by the terminal in the technology described in this specification is used for. The communications module 513 is configured to support the terminal 10 in communicating with the managed device. The terminal 10 may further include a storage module 511, configured to store program code and data of the terminal 10.

The processing module 512 may be a processor or a controller, and for example, may be a central processing unit, a general purpose processor, a digital signal processor, an application-specific integrated circuit, a field programmable gate array or another programmable logic device, a transistor logic device, a hardware component, or any combination thereof. The processing module 512 can implement or perform various examples of logic blocks, modules, and circuits described with reference to content disclosed in this application. The processor may alternatively be a combination, for example, a combination including one or more microprocessors or a combination of a digital signal processor and a microprocessor, for implementing a computing function. The communications module 513 may be a communications interface or the like. The storage module 511 may be a memory.

When the processing module 512 is a processor, the communications module 513 is a communications interface, and the storage module 511 is a memory, the terminal in this embodiment of this application may be a device shown in FIG. 3.

Figure 13:
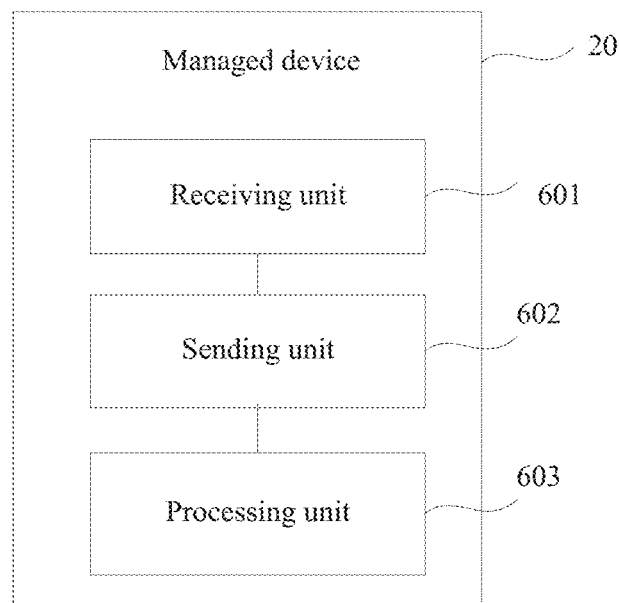
FIG. 13 is a schematic structural diagram 2 of a managed device according to an embodiment of this application.

When function modules corresponding to functions are divided into. FIG. 13 is a possible schematic structural diagram of a terminal according to the foregoing embodiment. The terminal 10 includes a receiving unit 601, a sending unit 602, and a processing unit 603. The receiving unit 601 is configured to support the managed device 20 in receiving a first request sent by the terminal and performing S105 and S118. The sending unit 602 is configured to support the managed device 20 in sending at least one piece of media file information to the terminal and performing S111. The processing unit 603 is configured to support the managed device 20 in performing step S106 (specifically 1061 and 1062), S10, and S119 in the foregoing embodiment. All related content of the steps in the foregoing method embodiment may be quoted to functional descriptions of corresponding functional modules, and details are not described herein again.

Specifically, in hardware implementation, the sending unit 602 and the receiving unit 601 may be integrated together to form a communications interface of a managed device shown in FIG. 4. The processing unit 603 may be integrated into a processor of the managed device shown in FIG. 4.

Figure 14:
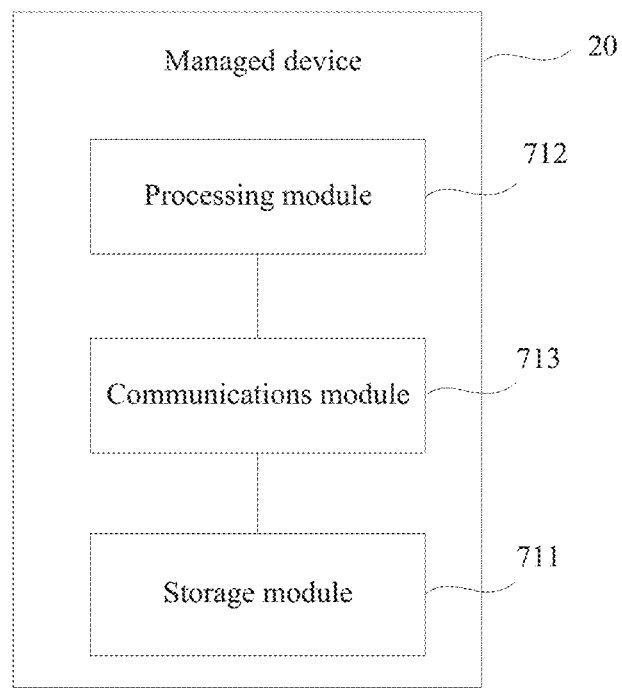
FIG. 14 is a schematic structural diagram 3 of a managed device according to an embodiment of this application.

When an integrated unit is used, FIG. 14 is a possible schematic diagram of a logical structure of a managed device according to the foregoing embodiment. The managed device 20 includes a processing module 712 and a communications module 713. The processing module 712 is configured to perform control management on actions of the managed device. For example, the processing module 712 is configured to: receive a first request sent by a terminal in the foregoing embodiment, perform S105 and S118, send at least one piece of media file information to the terminal, and perform S111, S106, S110, and S119. For specific step performing, refer to the foregoing embodiment, and details are not described herein in this application again. And/or another process in the technology described in this specification is used for. The communications module 713 is configured to support the managed device 20 in communicating with the terminal. The managed device 20 may further include a storage module 711, configured to store program code and data of the managed device 20.

The processing module 712 may be a processor or a controller, and for example, may be a central processing unit, a general purpose processor, a digital signal processor, an application-specific integrated circuit, a field programmable gate array or another programmable logic device, a transistor logic device, a hardware component, or any combination thereof. The processing module 712 can implement or perform various examples of logic blocks, modules, and circuits described with reference to content disclosed in this application. The processor may alternatively be a combination, for example, a combination including one or more microprocessors or a combination of a digital signal processor and a microprocessor, for implementing a computing function. The communications module 713 may be a communications interface or the like. The storage module 711 may be a memory.

When the processing module 712 is a processor, the communications module 713 is a communications interface, and the storage module 711 is a memory, the terminal in this embodiment of this application may be a device shown in FIG. 4.

According to one aspect, an embodiment of this application provides a computer-readable storage medium. The computer-readable storage medium stores an instruction. When the computer-readable storage medium is run on a terminal, the terminal is caused to perform steps S101, S109, S113, S117, S102, S112, S103, S104, S107, S114, S116 (specifically S116a and S116b), S108, and S115 in the foregoing embodiment. For specific step performing, refer to the foregoing embodiment, and details are not described herein in this application again.

According to another aspect, an embodiment of this application provides a computer-readable storage medium. The computer-readable storage medium stores an instruction. When the computer-readable storage medium is run on a managed device, the managed device is caused to: receive a first request sent by a terminal in the foregoing embodiment, perform S105 and S118, send at least one piece of media file information to the terminal, and perform S111, S106 (specifically 1061 and 1062), S110, and S119. For specific step performing, refer to the foregoing embodiment, and details are not described herein in this application again.

According to still another aspect, an embodiment of this application provides a computer program product including an instruction. When the instruction is run on a terminal, the terminal is caused to perform S101, S109, S113, S117. S102, S112. S103. S104, S107, S114. S16 (specifically S116a and S116b), S108, and S115. For specific step performing, refer to the foregoing embodiment, and details are not described herein in this application again. Alternatively, when the instruction is run on a managed device, the managed device is caused to: receive a first request sent by a terminal, perform S105 and S118, send at least one piece of media file information to the terminal, and perform S111, S106, S110, and S119. For specific step performing, refer to the foregoing embodiment, and details are not described herein in this application again.

According to yet another aspect, an embodiment of this application provides a communications system. The communications system includes a terminal shown in FIG. 11 and FIG. 12 and a managed device shown in FIG. 13 and FIG. 14. The terminal shown in FIG. 11 and FIG. 12 is configured to perform S101, S109, S113, S117, S102, S112, S103, S104, S107, S114, S116 (specifically S116a and S116b), S108, and S115 in the foregoing embodiment. The managed device shown in FIG. 13 and FIG. 14 is configured to: receive a first request sent by a terminal in the foregoing embodiment, perform S105 and S118, send at least one piece of media file information to the terminal, and perform S111, S106 (specifically 1061 and 1062), S110, and S119. For specific step performing, refer to the foregoing embodiment, and details are not described herein in this application again.

In the method for managing a media file in a managed device that is provided in the embodiments of this application, during actual use, the managed device (for example, acoustic equipment) usually does not have a display capability and the terminal has the display capability. Therefore, in this application, the terminal may obtain, by using the Bluetooth path established between the terminal and the managed device, the at least one piece of media file information stored in the managed device, and display, on the terminal by using the display capability of the terminal, the at least one piece of media file information stored in the managed device. In this way, information about at least one media file, for example, a name of the at least one media file, that is stored in the managed device or a sound image and a playing progress when the managed device plays a media file stored in the managed device may be displayed by using the display capability of the terminal. In addition, the terminal may further send a first operation instruction to the managed device based on an obtained first operation request, to be configured to instruct the managed device to perform the preset operation type on the target media file, to manage the at least one media file stored in the managed device.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (Solid State Disk, (SSD)), or the like.

The foregoing descriptions about implementations allow a person skilled in the art to clearly understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or part of the functions described above. For a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the described apparatus embodiment is only an example. For example, the module or unit division is only logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a flash memory, a removable hard disk, a read-only memory, a random access memory, a magnetic disk, or a compact disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method implemented by a terminal for managing a media file in a managed device, the method comprising:
displaying, on the terminal, a media file list that includes first media file information of one or more first candidate media files, wherein the one or more first candidate media files include an online media file that is stored in a server;
sending, by the terminal to the managed device using a Bluetooth path between the terminal and the managed device, a first request to obtain second media file information of one or more second candidate media files stored in the managed device, wherein the managed device is an acoustic equipment for acoustically outputting a media file;
receiving, by the terminal, a first response from the managed device, wherein the first response comprises at least one piece of the second media file information;
displaying, on the terminal, an updated media file list, wherein the updated media file list includes the first media file information and the at least one piece of the second media file information;
obtaining, by the terminal, a first operation request to select a first candidate media file on the updated media file list, wherein the first operation request instructs the terminal to store the first candidate media file in the managed device, and wherein the first candidate media file is the online media file;
determining that the terminal has permission to download the first candidate media file from the server;
in response to determining that the terminal has the permission, playing, by the terminal, the first candidate media file; and
causing, by the terminal, the managed device to store the first candidate media file being played by sending a first message and the first candidate media file that is in a form of a media stream to the managed device, wherein the first message instructs the managed device to store the media stream.

2. The method of claim 1, wherein the method further comprises:
determining whether the managed device has a storage capability; and
updating a status of an operation item of the first candidate media file to an enabled state when the managed device has the storage capability and the terminal has the permission to download the first candidate media file.

3. The method of claim 1, wherein before the sending the first message to the managed device, the method further comprises:
obtaining item label information of the first candidate media file; and
sending the item label information of the first candidate media file to the managed device.

4. The method of claim 1, wherein the method further comprises receiving a query request message from the managed device, and wherein the query request message carries a preset query field that queries whether the terminal has the permission to download the first candidate media file.

5. The method of claim 1, wherein the method further comprises sending a first operation instruction to the managed device after obtaining a second operation request for a target second candidate media file, wherein the first operation instruction instructs the managed device to process the target second candidate media file according to a preset operation type, and wherein the target second candidate media file is a media file indicated by any of the at least one piece of the second media file information displayed on the terminal.

6. The method of claim 5, wherein the first operation instruction instructs the managed device to delete the target second candidate media file or play the target second candidate media file.

7. The method of claim 5, wherein the first operation instruction instructs the managed device to pause playing of the target second candidate media file.

8. The method of claim 5, wherein the first operation instruction instructs the managed device to switch the target second candidate media file.

9. A terminal, comprising:
a memory storing instructions; and
at least one processor coupled to the memory and configured to execute the instructions to cause the terminal to be configured to:
display, on the terminal, a media file list that includes first media file information of one or more first candidate media files, wherein the one or more first candidate media files include an online media file that is stored in a server;
send, to a managed device using a Bluetooth path between the terminal and the managed device, a first request to obtain at least one piece of second media file information of one or more second candidate media files stored in the managed device,
wherein the managed device is an acoustic equipment for acoustically outputting a media file;
receive a first response from the managed device, wherein the first response comprises the at least one piece of the second media file information;
display an updated media file list, wherein the updated media file list includes the first media file information and the at least one piece of the second media file information on the terminal;
obtain a first operation request to select a first candidate media file on the updated media file list, wherein the first operation request instructs the terminal to store the first candidate media file to the managed device, and wherein the first candidate media file is the online media file;
determine that the terminal has permission to download the first candidate media file from the server;
in response to determining that the terminal has the permission, play the first candidate media file; and
cause the managed device to store the first candidate media file being played by sending a first message and the first candidate media file that is in a form of a media stream to the managed device, wherein the first message instructs the managed device to store the media stream.

10. The terminal of claim 9, wherein the instructions further cause the terminal to be configured to:
obtain whether the managed device has a storage capability; and
update a status of an operation item of the first candidate media file to an enabled state when the managed device has the storage capability and the terminal has the permission to download the first candidate media file.

11. The terminal of claim 9, wherein the instructions further cause the terminal to be configured to:
obtain item label information of the first candidate media file; and
send the item label information of the first candidate media file to the managed device.

12. The terminal of claim 9, wherein the instructions further cause the terminal to be configured to receive a query request message from the managed device, wherein the query request message carries a preset query field, and wherein the preset query field queries whether the terminal has the permission to download the first candidate media file.

13. The terminal of claim 9, wherein the instructions further cause the terminal to be configured to send a first operation instruction to the managed device after obtaining a second operation request for a target second candidate media file, wherein the first operation instruction instructs the managed device to process the target second candidate media file according to a preset operation type, and wherein the target second candidate media file is a media file indicated by any of the at least one piece of the second media file information displayed on the terminal.

14. The terminal of claim 13, wherein the first operation instruction instructs the managed device to delete the target second candidate media file, play the target second candidate media file, pause playing of the target second candidate media file, or switch the target second candidate media file.

15. A computer program product comprising computer-executable instructions for storage on a non-transitory computer-readable medium that, when executed by a processor, cause a terminal to:
  display, on the terminal, a media file list that includes first media file information of one or more first candidate media files, wherein the one or more first candidate media files include an online media file that is stored in a server;
  send, to a managed device using a Bluetooth path between the terminal and the managed device, a first request to obtain at least one piece of second media file information of one or more second candidate media files stored in the managed device, wherein the managed device is an acoustic equipment for acoustically outputting a media file;
  receive a first response from the managed device, wherein the first response comprises the at least one piece of the second media file information;
  display an updated media file list, wherein the updated media file list includes the first media file information and the at least one piece of the second media file information on the terminal;
  obtain a first operation request to select a first candidate media file on the updated media file list, wherein the first operation request instructs the terminal to store the first candidate media file to the managed device, and wherein the first candidate media file is the online media file;
  determine that the terminal has permission to download the first candidate media file from the server;
  in response to determining that the terminal has the permission, play the first candidate media file; and
  cause the managed device to store the first candidate media file being played by sending a first message and the first candidate media file that is in a form of a media stream to the managed device, wherein the first message instructs the managed device to store the media stream.

16. The computer program product of claim 15, wherein the instructions further cause the terminal to:
  obtain whether the managed device has a storage capability; and
  update a status of an operation item of the first candidate media file to an enabled state when the managed device has the storage capability and the terminal has the permission to download the first candidate media file.

17. The computer program product of claim 15, wherein the instructions further cause the terminal to be configured to:
  obtain item label information of the first candidate media file; and
  send the item label information of the first candidate media file to the managed device.

18. The computer program product of claim 15, wherein the instructions further cause the terminal to be configured to receive a query request message from the managed device, wherein the query request message carries a preset query field, and wherein the preset query field queries whether the terminal has the permission to download the first candidate media file.

19. The computer program product of claim 15, wherein the instructions further cause the terminal to be configured to send a first operation instruction to the managed device after obtaining a second operation request for a target second candidate media file, wherein the first operation instruction instructs the managed device to process the target second candidate media file according to a preset operation type, and wherein the target second candidate media file is a media file indicated by any of the at least one piece of the second media file information displayed on the terminal.

20. The computer program product of claim 19, wherein the first operation instruction instructs the managed device to delete the target second candidate media file, play the target second candidate media file, pause playing of the target second candidate_media file, or switch the target second candidate media file.

* * * * *

UNITED STATES PATENT AND TRADEMARK OFFICE
CERTIFICATE OF CORRECTION

PATENT NO. : 10,936,278 B2  
APPLICATION NO. : 16/474224  
DATED : March 2, 2021  
INVENTOR(S) : Zhidong Tao Page 1 of 1

It is certified that error appears in the above-identified patent and that said Letters Patent is hereby corrected as shown below:

In the Claims

Claim 20, Column 38, Line 49: "candidate_media file," should read "candidate media file"

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*